United States Patent
Givon

(10) Patent No.: US 9,046,962 B2
(45) Date of Patent: Jun. 2, 2015

(54) METHODS, SYSTEMS, APPARATUSES, CIRCUITS AND ASSOCIATED COMPUTER EXECUTABLE CODE FOR DETECTING MOTION, POSITION AND/OR ORIENTATION OF OBJECTS WITHIN A DEFINED SPATIAL REGION

(71) Applicant: EXTREME REALITY LTD., Herzeliya Pituah (IL)

(72) Inventor: Dor Givon, Tel Aviv (IL)

(73) Assignee: EXTREME REALITY LTD., Herzliya (IL)

( * ) Notice: Subject to any disclaimer, the term of this patent is extended or adjusted under 35 U.S.C. 154(b) by 137 days.

(21) Appl. No.: 13/737,345

(22) Filed: Jan. 9, 2013

(65) Prior Publication Data

US 2013/0120319 A1 May 16, 2013

Related U.S. Application Data

(63) Continuation-in-part of application No. 13/497,061, filed as application No. PCT/IL2010/000791 on Sep. 21, 2010, which is a continuation-in-part of application No. 13/734,987, filed on Jan. 6, 2013, (Continued)

(51) Int. Cl.
| | |
|---|---|
| G06F 3/042 | (2006.01) |
| G06F 3/041 | (2006.01) |
| G06T 15/00 | (2011.01) |
| G06K 9/00 | (2006.01) |

(52) U.S. Cl.
CPC .................................. *G06F 3/0425* (2013.01)

(58) Field of Classification Search
USPC ........................... 345/175, 173, 419; 382/154
See application file for complete search history.

(56) References Cited

U.S. PATENT DOCUMENTS

| 4,376,950 A | 3/1983 | Brown et al. |
| 5,130,794 A | 7/1992 | Ritchey |

(Continued)

FOREIGN PATENT DOCUMENTS

| EP | 1 115254 | 7/2001 |
| JP | 10-040418 | 2/1998 |

(Continued)

OTHER PUBLICATIONS

Carranza et al., "Free-Viewpoint Video of 1-39 Human Actors", Proc. of ACM Siggraph 2003, Jul. 27, 2003.

(Continued)

*Primary Examiner* — Temesgh Ghebretinsae
*Assistant Examiner* — Benyam Ketema
(74) *Attorney, Agent, or Firm* — Vladimir Sherman; Professional Patent Solutions

(57) ABSTRACT

The present invention includes methods, systems, apparatuses, circuits and associated computer executable code for detecting motion, position and/or orientation of objects within a defined spatial region. According to some embodiments, a defined spatial region (hereinafter also referred to as the: "Active Space") may be monitored, by any type of appropriate sensor or sensors, and position, orientation and movement of objects within the active space may be determined. Determined position, orientation and movement of objects within the active space may be translated to control signals or other forms of input for an associated computational device.

20 Claims, 30 Drawing Sheets

Related U.S. Application Data which is a continuation of application No. 12/092,220, filed as application No. PCT/IL2006/001254 on Oct. 31, 2006, now Pat. No. 8,462,199, which is a continuation of application No. 11/277,578, filed on Mar. 27, 2006, now abandoned.

(60) Provisional application No. 61/585,058, filed on Jan. 10, 2012, provisional application No. 61/585,147, filed on Jan. 10, 2012, provisional application No. 61/244,136, filed on Sep. 21, 2009, provisional application No. 60/731,274, filed on Oct. 31, 2005.

(56) References Cited

U.S. PATENT DOCUMENTS

| | | |
|---|---|---|
| 5,515,183 A | 5/1996 | Hashimoto |
| 5,691,885 A | 11/1997 | Ward et al. |
| 5,703,704 A | 12/1997 | Nakagawa et al. |
| 5,745,719 A | 4/1998 | Falcon |
| 5,831,633 A | 11/1998 | Van Roy |
| 5,835,133 A | 11/1998 | Moreton et al. |
| 5,852,450 A | 12/1998 | Thingvold |
| 5,909,218 A | 6/1999 | Naka et al. |
| 6,115,482 A | 9/2000 | Sears et al. |
| 6,243,106 B1 | 6/2001 | Rehg et al. |
| 6,303,924 B1 | 10/2001 | Adan et al. |
| 6,317,130 B1 | 11/2001 | Ishikawa et al. |
| 6,362,468 B1* | 3/2002 | Murakami et al. .......... 250/221 |
| 6,388,670 B2 | 5/2002 | Naka et al. |
| 6,512,838 B1* | 1/2003 | Rafii et al. .................. 382/106 |
| 6,529,643 B1 | 3/2003 | Loce et al. |
| 6,545,663 B1 | 4/2003 | Arbter et al. |
| 6,554,706 B2 | 4/2003 | Kim et al. |
| 6,597,801 B1 | 7/2003 | Cham et al. |
| 6,657,670 B1 | 12/2003 | Cheng |
| 6,674,877 B1 | 1/2004 | Jojic et al. |
| 6,681,031 B2 | 1/2004 | Cohen et al. |
| 6,710,770 B2* | 3/2004 | Tomasi et al. ............... 345/168 |
| 6,791,531 B1* | 9/2004 | Johnston et al. ............. 345/157 |
| 6,833,843 B2 | 12/2004 | Mojaver et al. |
| 6,906,687 B2 | 6/2005 | Werner |
| 7,061,492 B2 | 6/2006 | Carrai et al. |
| 7,061,532 B2 | 6/2006 | Silverstein |
| 7,116,330 B2 | 10/2006 | Marshall et al. |
| 7,123,292 B1 | 10/2006 | Seeger et al. |
| 7,184,589 B2 | 2/2007 | Okubo |
| 7,227,526 B2* | 6/2007 | Hildreth et al. ............. 345/156 |
| 7,257,237 B1 | 8/2007 | Luck et al. |
| 7,308,112 B2 | 12/2007 | Fujimura et al. |
| 7,366,278 B2 | 4/2008 | Fu et al. |
| 7,429,997 B2 | 9/2008 | Givon |
| 7,629,967 B2* | 12/2009 | Newton ....................... 345/173 |
| 7,755,608 B2 | 7/2010 | Chang et al. |
| 7,783,118 B2 | 8/2010 | Zhou |
| 7,885,480 B2 | 2/2011 | Bryll et al. |
| 7,903,141 B1 | 3/2011 | Mariano et al. |
| 7,936,932 B2 | 5/2011 | Bashyam et al. |
| 7,978,917 B2 | 7/2011 | Lei et al. |
| 8,005,263 B2 | 8/2011 | Fujimura et al. |
| 8,036,494 B2 | 10/2011 | Chen |
| 8,094,873 B2 | 1/2012 | Kelusky et al. |
| 8,094,943 B2 | 1/2012 | Eaton et al. |
| 8,107,726 B2 | 1/2012 | Xu et al. |
| 8,111,284 B1 | 2/2012 | Givon |
| 8,114,172 B2 | 2/2012 | Givon |
| 8,237,775 B2 | 8/2012 | Givon |
| 8,432,390 B2 | 4/2013 | Givon |
| 8,462,199 B2 | 6/2013 | Givon |
| 8,508,508 B2* | 8/2013 | Newton ....................... 345/175 |
| 2001/0007452 A1 | 7/2001 | Naka et al. |
| 2001/0022579 A1* | 9/2001 | Hirabayashi ................. 345/175 |
| 2002/0191239 A1 | 12/2002 | Psaltis et al. |
| 2003/0007680 A1 | 1/2003 | Iijima et al. |
| 2003/0137494 A1* | 7/2003 | Tulbert ........................ 345/173 |
| 2003/0174125 A1* | 9/2003 | Torunoglu et al. .......... 345/168 |
| 2004/0104894 A1* | 6/2004 | Tsukada et al. ............. 345/168 |
| 2004/0155962 A1 | 8/2004 | Marks |
| 2004/0161133 A1 | 8/2004 | Elazar et al. |
| 2004/0193413 A1 | 9/2004 | Wilson et al. |
| 2004/0228530 A1 | 11/2004 | Schwartz |
| 2005/0023448 A1 | 2/2005 | Ogawara et al. |
| 2005/0041842 A1 | 2/2005 | Frakes et al. |
| 2005/0063596 A1 | 3/2005 | Yomdin et al. |
| 2005/0166163 A1 | 7/2005 | Chang et al. |
| 2005/0190162 A1* | 9/2005 | Newton ....................... 345/175 |
| 2005/0232514 A1 | 10/2005 | Chen |
| 2005/0259870 A1 | 11/2005 | Kondo et al. |
| 2005/0271279 A1 | 12/2005 | Fujimura et al. |
| 2006/0010400 A1 | 1/2006 | Dehlin et al. |
| 2006/0056679 A1 | 3/2006 | Redert et al. |
| 2006/0101349 A1* | 5/2006 | Lieberman et al. ......... 715/773 |
| 2006/0104480 A1 | 5/2006 | Fleisher |
| 2006/0139314 A1* | 6/2006 | Bell ............................. 345/156 |
| 2006/0164230 A1 | 7/2006 | DeWind et al. |
| 2006/0187305 A1 | 8/2006 | Trivedi et al. |
| 2006/0294509 A1 | 12/2006 | Mital et al. |
| 2007/0098250 A1 | 5/2007 | Molgaard et al. |
| 2007/0183633 A1 | 8/2007 | Hoffmann |
| 2007/0183663 A1 | 8/2007 | Wang et al. |
| 2007/0236475 A1 | 10/2007 | Wherry |
| 2007/0259717 A1 | 11/2007 | Mattice et al. |
| 2007/0285419 A1 | 12/2007 | Givon |
| 2007/0285554 A1 | 12/2007 | Givon |
| 2008/0007533 A1 | 1/2008 | Hotelling |
| 2008/0013793 A1 | 1/2008 | Hillis et al. |
| 2008/0030460 A1 | 2/2008 | Hildreth et al. |
| 2008/0036732 A1 | 2/2008 | Wilson et al. |
| 2008/0037829 A1 | 2/2008 | Givon |
| 2008/0037869 A1 | 2/2008 | Zhou |
| 2008/0101722 A1 | 5/2008 | Bryll et al. |
| 2008/0104547 A1 | 5/2008 | Morita et al. |
| 2008/0111710 A1 | 5/2008 | Boillot |
| 2008/0143975 A1 | 6/2008 | Dennard et al. |
| 2008/0148149 A1 | 6/2008 | Singh et al. |
| 2008/0181499 A1 | 7/2008 | Yang et al. |
| 2009/0058833 A1 | 3/2009 | Newton |
| 2009/0062696 A1 | 3/2009 | Nathan et al. |
| 2009/0080715 A1 | 3/2009 | Van Beek et al. |
| 2009/0116732 A1 | 5/2009 | Zhou et al. |
| 2009/0141987 A1 | 6/2009 | McGarry et al. |
| 2010/0066735 A1 | 3/2010 | Givon |
| 2010/0111370 A1 | 5/2010 | Black et al. |
| 2010/0141802 A1 | 6/2010 | Knight et al. |
| 2010/0194862 A1 | 8/2010 | Givon |
| 2010/0208038 A1 | 8/2010 | Kutliroff et al. |
| 2010/0303290 A1 | 12/2010 | Mathe |
| 2010/0328351 A1 | 12/2010 | Tan |
| 2011/0019056 A1* | 1/2011 | Hirsch et al. ............. 348/333.01 |
| 2011/0052068 A1 | 3/2011 | Cobb et al. |
| 2011/0069152 A1 | 3/2011 | Wang et al. |
| 2011/0080496 A1 | 4/2011 | Givon |
| 2011/0129124 A1 | 6/2011 | Givon |
| 2011/0163948 A1 | 7/2011 | Givon et al. |
| 2011/0286673 A1 | 11/2011 | Givon et al. |
| 2011/0292036 A1 | 12/2011 | Sali et al. |
| 2012/0176414 A1 | 7/2012 | Givon |
| 2012/0176477 A1 | 7/2012 | Givon |
| 2012/0218183 A1 | 8/2012 | Givon et al. |
| 2013/0120319 A1 | 5/2013 | Givon |

FOREIGN PATENT DOCUMENTS

| | | |
|---|---|---|
| JP | 2001-246161 | 9/2001 |
| JP | 2002-216146 | 8/2002 |
| JP | 2004-062692 | 2/2004 |
| JP | 2006-040271 | 2/2006 |
| JP | 2007-531113 | 1/2007 |
| JP | 2007-302223 | 11/2007 |
| WO | WO 03/025859 | 3/2003 |
| WO | WO 03/039698 | 5/2003 |
| WO | WO 2004/013814 | 2/2004 |
| WO | WO 2004/094943 | 11/2004 |
| WO | WO 2005/114556 | 12/2005 |

(56) References Cited

FOREIGN PATENT DOCUMENTS

| WO | WO 2006/011153 | 2/2006 |
|---|---|---|
| WO | WO 2006/099597 | 9/2006 |
| WO | WO 2008/126069 | 10/2008 |
| WO | WO 2011/033519 | 3/2011 |
| WO | WO 2013/069023 | 5/2013 |

OTHER PUBLICATIONS

Cheung G K M et al.,"Shape-from-silhouette of articulated objects and its use for human body kinematics estimation and motion capture", Proceedings / 2003 IEEE Computer Society Conference on Computer Vision and Pattern Recognition, Jun. 18-20, 2003, Madison, Wisconsin.

Starck et al., "Model-based multiple view reconstruction of people", Proceedings of the Eight IEEE International Conference on Computer Vision. (ICCV). Nice, France, Oct. 13-16, 2003.

Molet T et al: "An animation interface designed for motion capture", Computer Animation '97 Geneva, Switzerland Jun. 5-6, 1997.

Kronrod B et al., "Optimized triangle mesh compression using prediction trees", Computer Graphics and Applications, 2000. Proceedings. the Eighth Pacific Conference on Hong Kong, China Oct. 3-5, 2000.

Theobalt C et al.,: "Enhancing silhouette-based human motion capture with 3D motion fields", Computer Graphics and Applications, 2003. Proceedings. 11th Pacific Conference on Oct. 8-10, 2003, Piscataway, NJ, USA, IEEE, Oct. 8, 2003.

Bregler C et al: "Tracking people with twists and exponential maps", Computer Vision and Pattern Recognition, 1998. Proceedings. 1998 IEEE Computer Society Conference on Santa Barbara, CA, USA Jun. 23-25, 1998, Los Alamitos, CA,USA,IEEE Comput. Soc, US, Jun. 23, 1998, pp. 8-15, XP010291718.

Sminchisescu et al. "Estimated Articulated Human Motion with Covariance Scaled Sampling". Published 2003.

Sappa et al. "Monocular 3D Human Body Reconstruction toward Depth Augmentation of Television Sequences". Published 2003.

Sminchisescu et al. "Human Pose Estimation from Silhouettes A Consistent Approach Using Distance Level Set". Published 2002.

Sminchisescu C et al: "Kinematic jump processes for monocular 3D human tracking", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. U.A, vol. 1, Jun. 18, 2003, pp. 69-76, XP010644883, DOI: 10.1109/CVPR.2003.1211339 ISBN: 978-0-7695-1900-5.

Ren NG, "Digital Light Field Photography", Jul. 2006, (available at www.lytro.com/rennig-thesis.pdf).

D'Apuzzo N et al: "Modeling human bodies from video sequences", SPIE Proceedings, The International Society for Optical Engineering—SPIE, Bellingham, Washington, USA, vol. 3641, Jan. 1, 1998, pp. 36-47, XP002597223, ISSN: 0277-786X, DOI: 10.1117/12.333796.

* cited by examiner

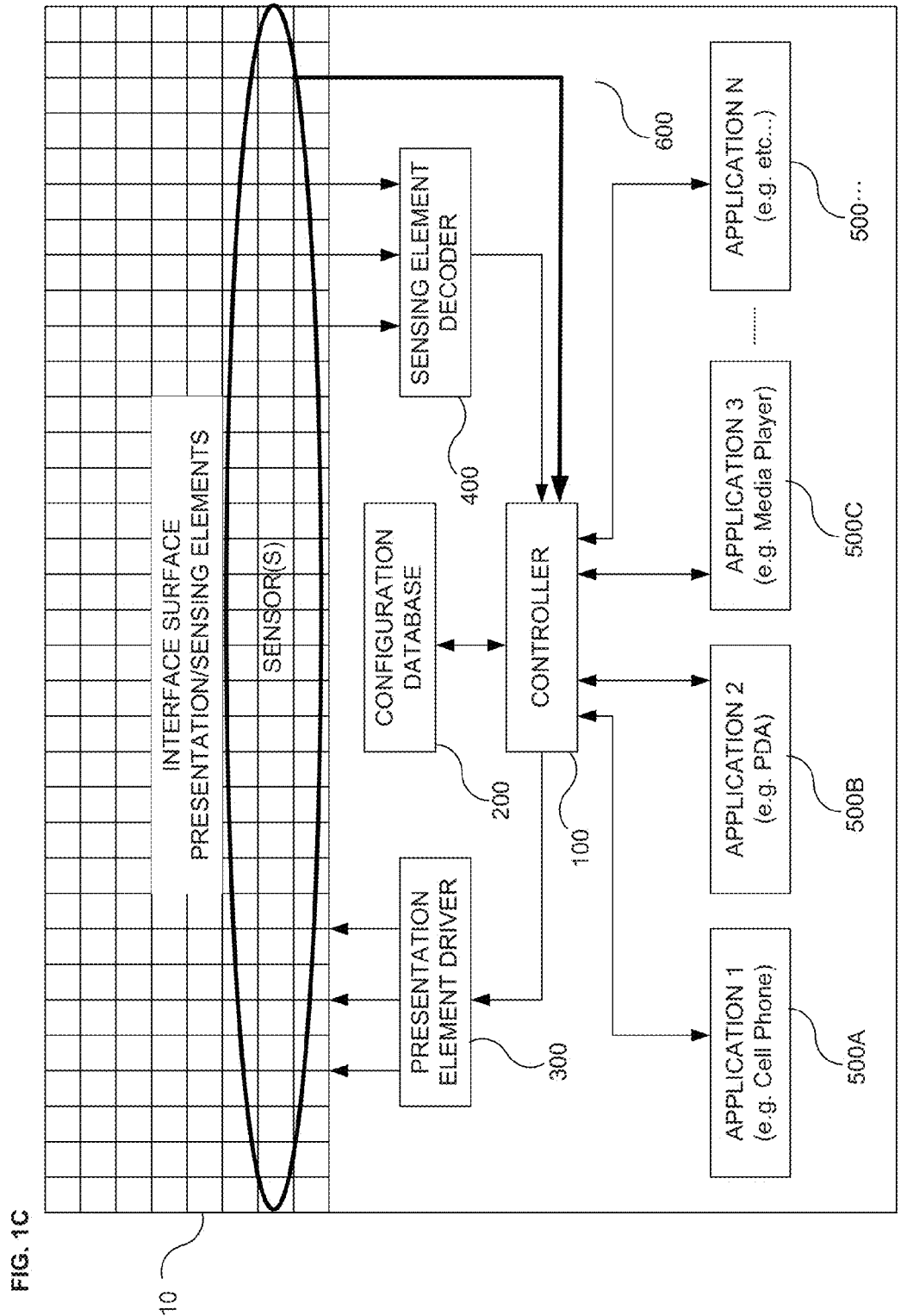

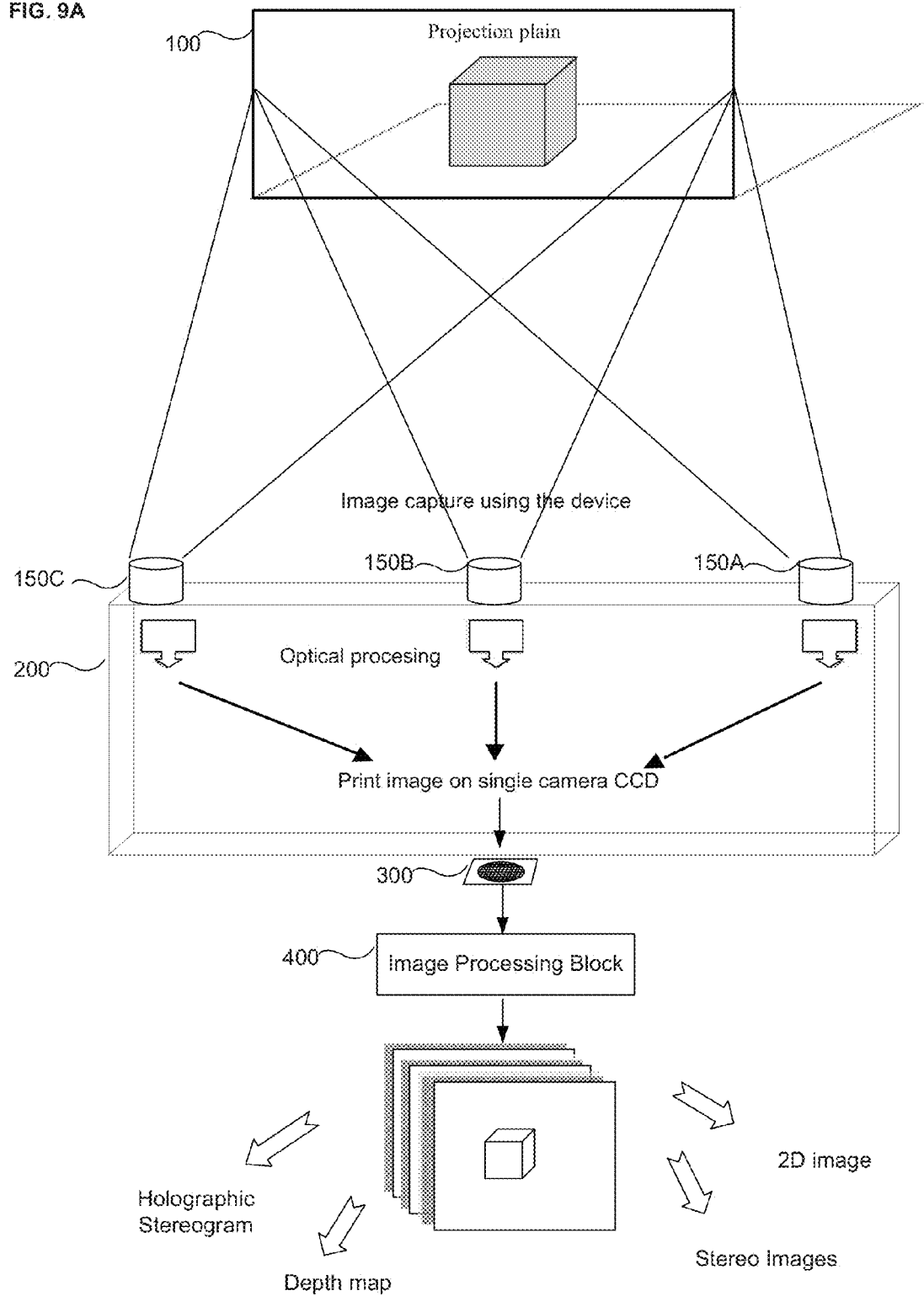

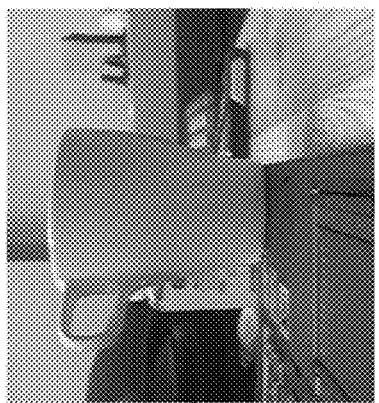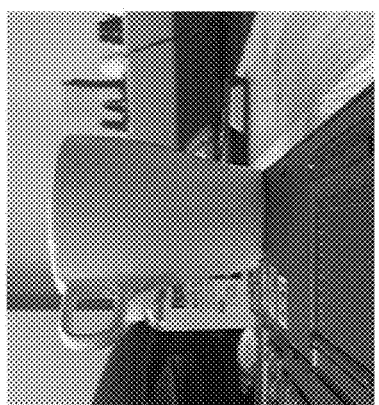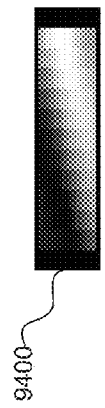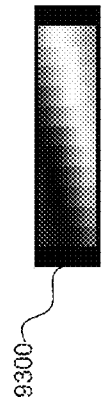
FIG. 13A
FIG. 13B
FIG. 13C

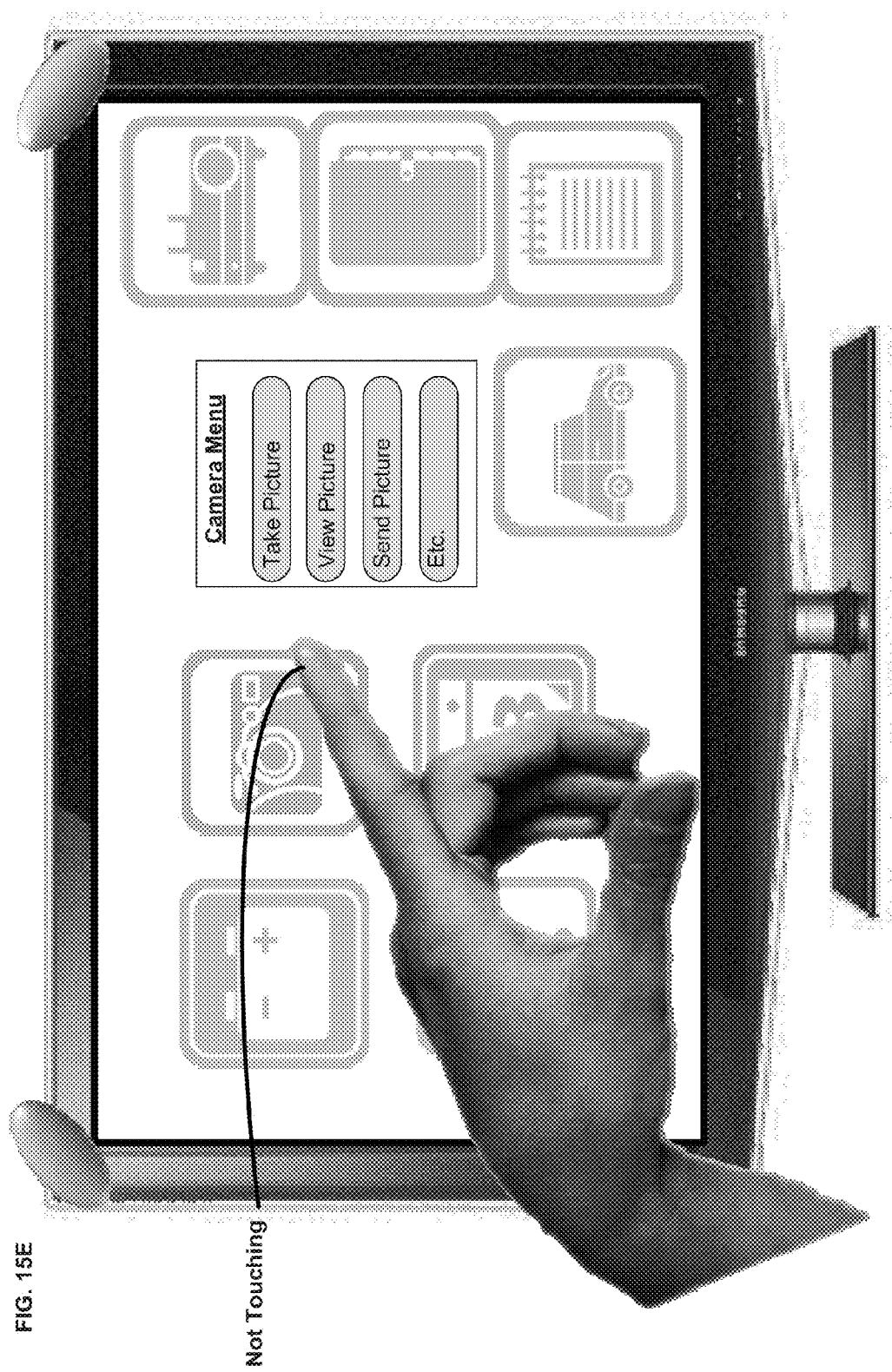

US 9,046,962 B2

METHODS, SYSTEMS, APPARATUSES, CIRCUITS AND ASSOCIATED COMPUTER EXECUTABLE CODE FOR DETECTING MOTION, POSITION AND/OR ORIENTATION OF OBJECTS WITHIN A DEFINED SPATIAL REGION

RELATED APPLICATIONS

This application is a non-provisional application claiming the benefit of:
U.S. Provisional Patent Application Ser. Nos. 61/585,058 and 61/585,147, both filed on Jan. 10, 2012, titled "Methods Circuits Assemblies Systems and Associated Computer Executable Code for Pseudo-Touch Screen Human Machine Interfacing"; and
this application is a continuation in part of:
U.S. patent application Ser. No. 13/497,061, titled: "METHODS CIRCUITS APPARATUS AND SYSTEMS FOR HUMAN MACHINE INTERFACING WITH AN ELECTRONIC APPLIANCE", filed on Mar. 20, 2012, which '061 application is a National Phase of International Application PCT/IL2010/000791, filed on Sep. 21, 2010, which International Application claims the benefit of U.S. Provisional Patent Application Ser. No. 61/244,136, filed on Sep. 21, 2009; and
this application is a continuation in part of:
U.S. patent application Ser. No. 13/734,987, titled: "AN APPARATUS METHOD AND SYSTEM FOR IMAGING", filed on Jan. 6, 2013, which '987 application is a continuation of U.S. patent application Ser. No. 12/092,220, filed on Apr. 30, 2008, which '220 application is a National Phase of International Application PCT/IL2006/001254, filed on Oct. 31, 2006, which International Application is a continuation of U.S. patent application Ser. No. 11/277,578 filed Mar. 27, 2006, which claims the benefit of U.S. Provisional Patent Application Ser. No. 60/731,274, filed on Oct. 31, 2005; and
each of the aforementioned applications is hereby incorporated into this application by reference in its entirety.

FIELD OF THE INVENTION

The present invention is generally related to the field of electronics. More specifically, the present invention relates to methods, systems, apparatuses, circuits and associated computer executable code for detecting motion, position and/or orientation of objects within a defined spatial region.

BACKGROUND

The concept of touchscreens was mentioned as early as 1965. E. A. Johnson described his work on capacitive touch screens in a short article published in 1965 and then more fully—along with photographs and diagrams—in an article published in 1967. A description of the applicability of the touch technology for air traffic control was described in an article published in 1968. Bent Stumpe with the aid of Frank Beck, both engineers from CERN, developed a transparent touch screen in the early 1970s and it was manufactured by CERN and put to use in 1973. This touchscreen was based on Bent Stumpe's work at a television factory in the early 1960s. A resistive touch screen was developed by American inventor G Samuel Hurst and the first version produced in 1982.

From 1979-1985, the Fairlight CMI (and Fairlight CMI IIx) was a high-end musical sampling and re-synthesis workstation that utilized light pen technology, with which the user could allocate and manipulate sample and synthesis data, as well as access different menus within its OS by touching the screen with the light pen. The later Fairlight series IIT models used a graphics tablet in place of the light pen. The HP-150 from 1983 was one of the world's earliest commercial touchscreen computers. Similar to the PLATO IV system, the touch technology used employed infrared transmitters and receivers mounted around the bezel of its 9" Sony Cathode Ray Tube (CRT), which detected the position of any non-transparent object on the screen.

In the early 1980s General Motors tasked its Delco Electronics division with a project aimed at replacing an automobile's non essential functions (i.e. other than throttle, transmission, braking and steering) from mechanical or electro-mechanical systems with solid state alternatives wherever possible. The finished device was dubbed the ECC for "Electronic Control Center", a digital computer and software control system hardwired to various peripheral sensors, servos, solenoids, antenna and a monochrome CRT touchscreen that functioned both as display and sole method of input.

In 1986 the first graphical point of sale software was demonstrated on the 16-bit Atari 520ST color computer. It featured a color touchscreen widget-driven interface. The ViewTouch point of sale software was first shown by its developer, Gene Mosher, at Fall Comdex, 1986, in Las Vegas, Nev. to visitors at the Atari Computer demonstration area and was the first commercially available POS system with a widget-driven color graphic touch screen interface.

Sears et al. (1990) gave a review of academic research on single and multi-touch human—computer interaction of the time, describing gestures such as rotating knobs, swiping the screen to activate a switch (or a U-shaped gesture for a toggle switch), and touchscreen keyboards (including a study that showed that users could type at 25 wpm for a touchscreen keyboard compared with 58 wpm for a standard keyboard); multitouch gestures such as selecting a range of a line, connecting objects, and a "tap-click" gesture to select while maintaining location with another finger are also described.

An early attempt at a handheld game console with touchscreen controls was Sega's intended successor to the Game Gear, though the device was ultimately shelved and never released due to the expensive cost of touchscreen technology in the early 1990s. Touchscreens would not be popularly used for video games until the release of the Nintendo DS in 2004. Until recently, most consumer touchscreens could only sense one point of contact at a time, and few have had the capability to sense how hard one is touching. This has changed with the commercialization of multi-touch technology There are a variety of touchscreen technologies that have different methods of sensing touch.
Resistive A resistive touchscreen panel comprises several layers, the most important of which are two thin, transparent electrically-resistive layers separated by a thin space. These layers face each other; with a thin gap between. The top screen (the screen that is touched) has a coating on the underside surface of the screen. Just beneath it is a similar resistive layer on top of its substrate. One layer has conductive connections along its sides, the other along top and bottom. A voltage is applied to one layer, and sensed by the other. When an object, such as a fingertip or stylus tip, presses down on the outer surface, the two layers touch to become connected at that point: The panel then behaves as a pair of voltage dividers, one axis at a time. By rapidly switching between each layer, the position of a pressure on the screen can be read.

Resistive touch is used in restaurants, factories and hospitals due to its high resistance to liquids and contaminants. A major benefit of resistive touch technology is its low cost. Disadvantages include the need to press down, and a risk of damage by sharp objects. Resistive touchscreens also suffer from poorer contrast, due to having additional reflections from the extra layer of material placed over the screen Surface Acoustic Wave Surface acoustic wave (SAW) technology uses ultrasonic waves that pass over the touchscreen panel. When the panel is touched, a portion of the wave is absorbed. This change in the ultrasonic waves registers the position of the touch event and sends this information to the controller for processing. Surface wave touchscreen panels can be damaged by outside elements. Contaminants on the surface can also interfere with the functionality of the touchscreen.

Capacitive

A capacitive touchscreen panel consists of an insulator such as glass, coated with a transparent conductor such as indium tin oxide (ITO). As the human body is also an electrical conductor, touching the surface of the screen results in a distortion of the screen's electrostatic field, measurable as a change in capacitance. Different technologies may be used to determine the location of the touch. The location is then sent to the controller for processing.

Unlike a resistive touchscreen, one cannot use a capacitive touchscreen through most types of electrically insulating material, such as gloves. This disadvantage especially affects usability in consumer electronics, such as touch tablet PCs and capacitive smartphones in cold weather. It can be overcome with a special capacitive stylus, or a special-application glove with an embroidered patch of conductive thread passing through it and contacting the user's fingertip.

The largest capacitive display manufacturers continue to develop thinner and more accurate touchscreens, with touchscreens for mobile devices now being produced with 'in-cell' technology that eliminates a layer, such as Samsung's Super AMOLED screens, by building the capacitors inside the display itself. This type of touchscreen reduces the visible distance (within millimetres) between the user's finger and what the user is touching on the screen, creating a more direct contact with the content displayed and enabling taps and gestures to be even more responsive.

Surface Capacitance

In this basic technology, only one side of the insulator is coated with a conductive layer. A small voltage is applied to the layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel. As it has no moving parts, it is moderately durable but has limited resolution, is prone to false signals from parasitic capacitive coupling, and needs calibration during manufacture. It is therefore most often used in simple applications such as industrial controls and kiosks.

Projected Capacitance

Projected Capacitive Touch (PCT; also PCAP) technology is a variant of capacitive touch technology. All PCT touch screens are made up of a matrix of rows and columns of conductive material, layered on sheets of glass. This can be done either by etching a single conductive layer to form a grid pattern of electrodes, or by etching two separate, perpendicular layers of conductive material with parallel lines or tracks to form a grid. Voltage applied to this grid creates a uniform electrostatic field, which can be measured. When a conductive object, such as a finger, comes into contact with a PCT panel, it distorts the local electrostatic field at that point. This is measurable as a change in capacitance. If a finger bridges the gap between two of the "tracks," the charge field is further interrupted and detected by the controller. The capacitance can be changed and measured at every individual point on the grid (intersection). Therefore, this system is able to accurately track touches. Due to the top layer of a PCT being glass, it is a more robust solution than less costly resistive touch technology. Additionally, unlike traditional capacitive touch technology, it is possible for a PCT system to sense a passive stylus or gloved fingers. However, moisture on the surface of the panel, high humidity, or collected dust can interfere with the performance of a PCT system. There are two types of PCT: mutual capacitance and self-capacitance.

Mutual Capacitance

This is common PCT approach, which makes use of the fact that most conductive objects are able to hold a charge if they are very close together. In mutual capacitive sensors, there is a capacitor at every intersection of each row and each column A 16-by-14 array, for example, would have 224 independent capacitors. A voltage is applied to the rows or columns. Bringing a finger or conductive stylus close to the surface of the sensor changes the local electrostatic field which reduces the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time Self-capacitance Self-capacitance sensors can have the same X-Y grid as mutual capacitance sensors, but the columns and rows operate independently. With self-capacitance, the capacitive load of a finger is measured on each column or row electrode by a current meter. This method produces a stronger signal than mutual capacitance, but it is unable to resolve accurately more than one finger, which results in "ghosting", or misplaced location sensing Infrared Grid An infrared touchscreen uses an array of X-Y infrared LED and photodetector pairs around the edges of the screen to detect a disruption in the pattern of LED beams. These LED beams cross each other in vertical and horizontal patterns. This helps the sensors pick up the exact location of the touch. A major benefit of such a system is that it can detect essentially any input including a finger, gloved finger, stylus or pen. It is generally used in outdoor applications and point of sale systems which can not rely on a conductor (such as a bare finger) to activate the touchscreen. Unlike capacitive touchscreens, infrared touchscreens do not require any patterning on the glass which increases durability and optical clarity of the overall system. Infrared touchscreens are sensitive to dirt/dust that can interfere with the IR beams, and suffer from parallax in curved surfaces and accidental press when the user hovers his/her finger over the screen while searching for the item to be selected Infrared Acrylic Projection A translucent acrylic sheet is used as a rear projection screen to display information. The edges of the acrylic sheet are illuminated by infrared LEDs, and infrared cameras are focused on the back of the sheet. Objects placed on the sheet are detectable by the cameras. When the sheet is touched by the user the deformation results in leakage of infrared light, which peaks at the points of maximum pressure indicating the user's touch location. Microsoft's PixelSense tables use this technology.

Dispersive Signal Technology

Introduced in 2002 by 3M, this system uses sensors to detect the piezoelectricity in the glass that occurs due to a touch. Complex algorithms then interpret this information and provide the actual location of the touch. The technology claims to be unaffected by dust and other outside elements, including scratches. Since there is no need for additional elements on screen, it also claims to provide excellent optical clarity. Also, since mechanical vibrations are used to detect a touch event, any object can be used to generate these events, including fingers and stylus. A downside is that after the initial touch the system cannot detect a motionless finger.

Acoustic Pulse Recognition

In this system, introduced by Tyco International's Elo division in 2006, the key to the invention is that a touch at each position on the glass generates a unique sound. Four tiny transducers attached to the edges of the touchscreen glass pick up the sound of the touch. The sound is then digitized by the controller and compared to a list of prerecorded sounds for every position on the glass. The cursor position is instantly updated to the touch location. APR is designed to ignore extraneous and ambient sounds, since they do not match a stored sound profile. APR differs from other attempts to recognize the position of touch with transducers or microphones, in using a simple table lookup method rather than requiring powerful and expensive signal processing hardware to attempt to calculate the touch location without any references. The touchscreen itself is made of ordinary glass, giving it good durability and optical clarity. It is usually able to function with scratches and dust on the screen with good accuracy. The technology is also well suited to displays that are physically larger. Similar to the dispersive signal technology system, after the initial touch, a motionless finger cannot be detected. However, for the same reason, the touch recognition is not disrupted by any resting objects.

All of the above techniques, however, share a couple major disadvantages. First, each of these techniques requires specialized hardware. This both raises the cost of implementing these techniques and prevents the use of these techniques with existing systems (i.e. there is no possibility of integrating these methods into existing displays).

Furthermore, all of these techniques require the user to actually touch the screen. This limits the possible designs and implementations of such products and further negates the possibility of separating the display from the interacting area/surface.

Accordingly, there is a need for methods and devices for detecting motion and position of objects within a specific region, without the need for touching or for replacing existing displays.

SUMMARY OF THE INVENTION

The present invention includes methods, systems, apparatuses, circuits and associated computer executable code for detecting motion, position and/or orientation of objects within a defined spatial region. According to some embodiments, a defined spatial region (hereinafter also referred to as the: "Active Space") may be monitored, by any type of appropriate sensor or sensors, and position, orientation and movement of objects within the active space may be determined. Determined position, orientation and movement of objects within the active space may be translated to control signals or other forms of input for an associated computational device.

According to some embodiments, monitoring of an active space may be performed by the use of an optical assembly comprising one or more image sensors adapted to acquire image information from the active space via two or more optical paths. Information relating to position, orientation and movement of objects within the active space may then be determined based on comparisons of the appearance of the objects from the different optical paths (viewing angles).

For example, a spatial region associated with an interface surface may be optically monitored through an optical assembly including: (1) at least one image sensor array (e.g. CCD or CMOS) functionally associated with the interface surface and positioned at or near a border segment of the interface surface, and (2) at least one optical reflector positioned at or near another border segment of the interface surface, which other border segment is within a line of site of the image sensor. Image processing logic, in the form of a dedicated image processing circuit or in the form of executable code running on a processor, may estimate position, motion and/or gestures of control objects (e.g. human fingers, pointer tools, etc.) on or near the interface surface by triangulating a location of the control objects relative to the interface surface using a composite image frame acquired by the image sensor, which composite image frame may be formed by light which was reflected or emitted from the control object, and which entered the at least one image sensor array (i) directly, and (ii) through at least one optical paths which includes at least one of the optical reflectors. Control logic tracking of control object position across multiple (substantially consecutive) acquired image frames may facilitate motion and/or gesture estimation. According to further embodiments, other sensor types and configurations may be implemented to monitor position, orientation and/or movement of control objects within an active space in proximity to an interface surface. For example, sensors may be embedded within or positioned beneath an interface surface, or sensors may be positioned at a distance from the active space (e.g. within a nearby wall). It should be understood that any sensor type and configuration adapted to monitor position, orientation and/or movement of control objects within an active space may be implemented according to the principles presented herein.

According to further embodiments, a controller of a display functionally associated with the active space may be adapted to alter the size, shape, appearance and/or location of elements within the display and/or alter the content and/or characteristics of the display based on the determined position, orientation and/or movement of objects within the active space. For example, a given icon upon an interactive display may be enlarged when it is determined that a finger of a user is approaching the given icon or the entire display may brighten when a finger approaches it.

According to yet further embodiments, a given spatial region (e.g. a desktop, a blackboard, a window, a defined volume of space, etc) may be transformed into a human machine interface by rendering within or adjacent to the given spatial region a graphic user interface (GUI) and simultaneously monitoring control objects within the given spatial region to determine user inputs. For example, a GUI may be rendered upon an ordinary desktop/countertop and positions and movements of a user's hand in proximity or touching the desktop/countertop monitored, such that by comparing the user hand positions and movements to the positions of the control elements within the GUI, user inputs may be determined. In this fashion an ordinary desktop/countertop may be converted into a touchscreen interface.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A-1C are functional block diagrams of exemplary systems for human machine interfacing, according to some embodiments of the present invention;

FIG. 9A shows a symbolic diagram of an optical assembly and image processing system according to some embodiments of the present invention producing a series of digital image data sets (e.g. frames);

FIG. 13A includes exemplary images which may be used as input to an algorithm for image processing, in accordance with some embodiments of the present invention;

FIGS. 13B-13C are exemplary outcomes of image processing being performed on the exemplary images presented in FIG. 13A, all in accordance with some embodiments of the present invention;

FIGS. 15A-15E are illustrations of an exemplary display and possible alterations of the exemplary display in response to an approaching control object (finger), wherein:

FIG. 15A illustrates the exemplary display prior to a control object approaching;

FIG. 15B illustrates the exemplary display being altered as the control object approaches, such that a control element in proximity to the approaching control object is enlarged;

FIG. 15C illustrates the exemplary display being altered as the control object approaches, such that an area of the display in proximity to the approaching control object is enlarged;

FIG. 15D illustrates the exemplary display being altered as the control object approaches, such that a control element in proximity to the approaching control object moves towards the control object as it approaches;

FIG. 15E illustrates the exemplary display being altered as the control object approaches, such that a menu relating to the control element (camera icon) in proximity to the approaching control object is opened and other control elements are relocated to allow for the menu to be displayed;

Figure 1A:
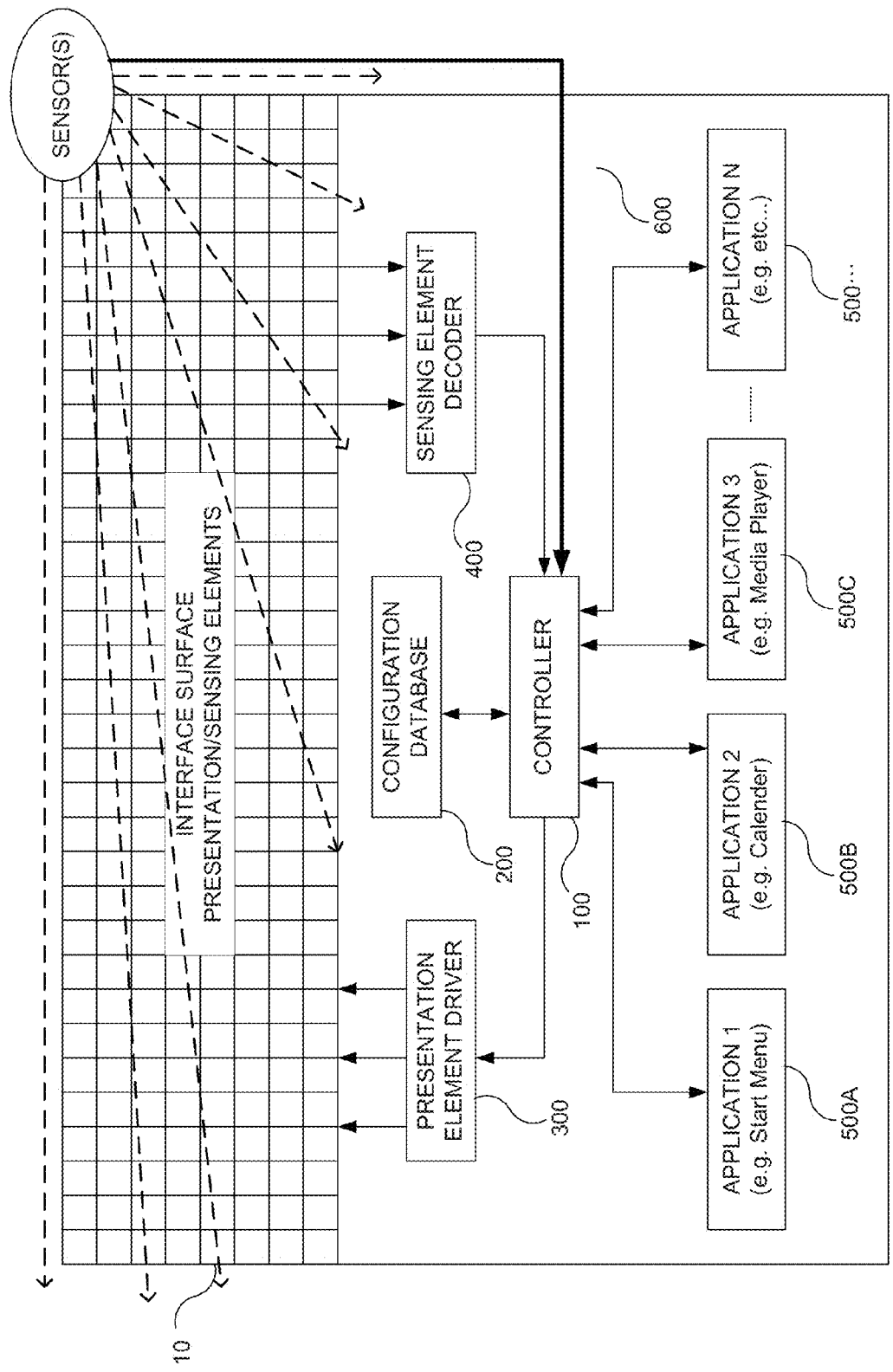

all in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The term server may refer to a single server or to a functionally associated cluster of servers.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, memory cards (for example SD card), SIM cards, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer, communication device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language or markup language. It will be appreciated that a variety of programming languages or techniques may be used to implement the teachings of the inventions as described herein.

The present invention includes methods, systems, apparatuses, circuits and associated computer executable code for detecting motion, position and/or orientation of objects within a defined spatial region. According to some embodiments, a defined spatial region (hereinafter also referred to as the: "Active Space") may be monitored [as shown in FIGS. 2-5], by any type of appropriate sensor or sensors, and position, orientation and movement of objects within the active space may be determined. Determined position, orientation and movement of objects within the active space may be translated to control signals or other forms of input for an associated computational device.

Figure 2:
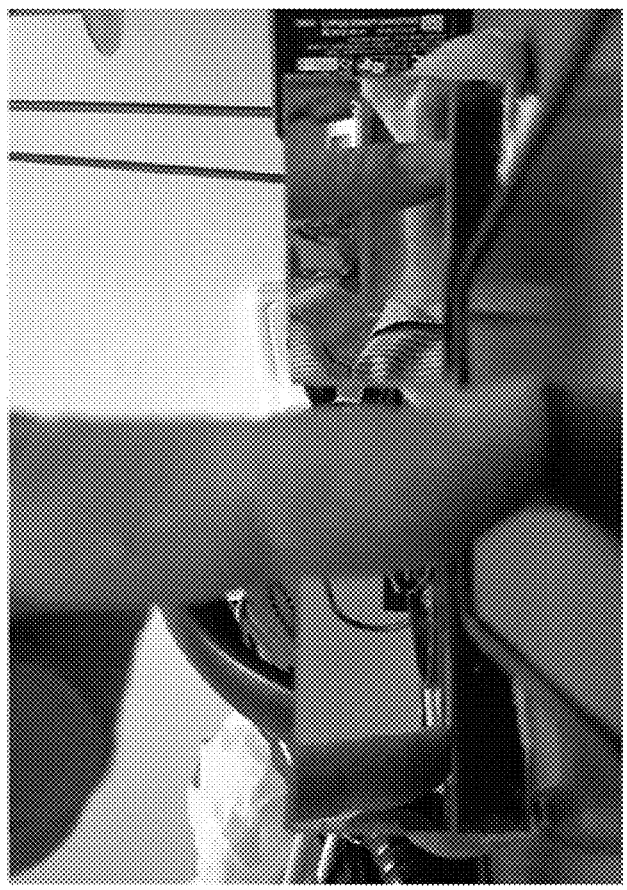
FIG. 2 is an illustration demonstrating the use of a single image sensor and a set of reflectors in order to obtain images of an active space from multiple viewing angles. The illustration contains an exemplary model of a smartphone with an image sensor and two reflectors, and the resulting image obtained by the image sensor, all in accordance with some embodiments of the present invention.
Figure 2:
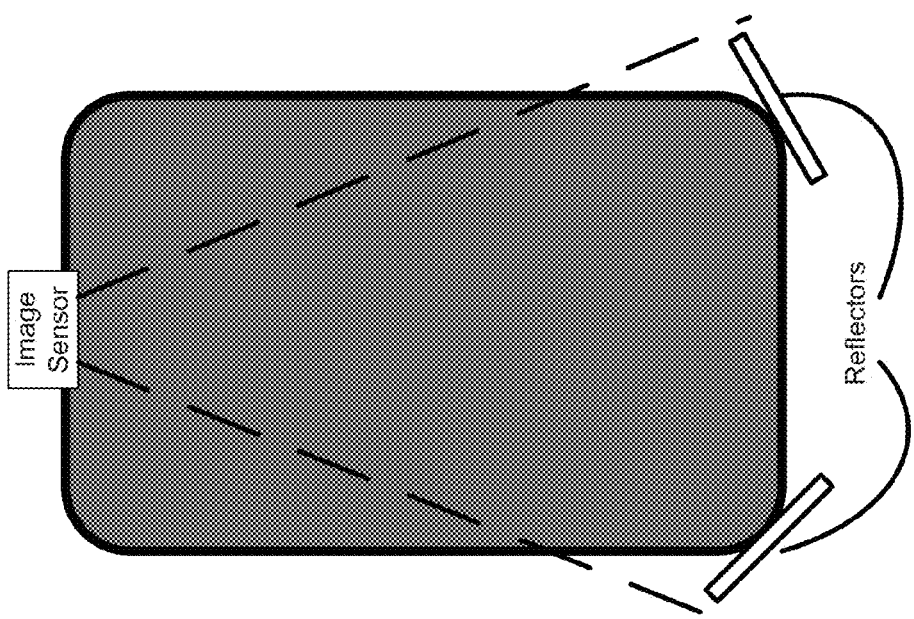
Figure 3A:
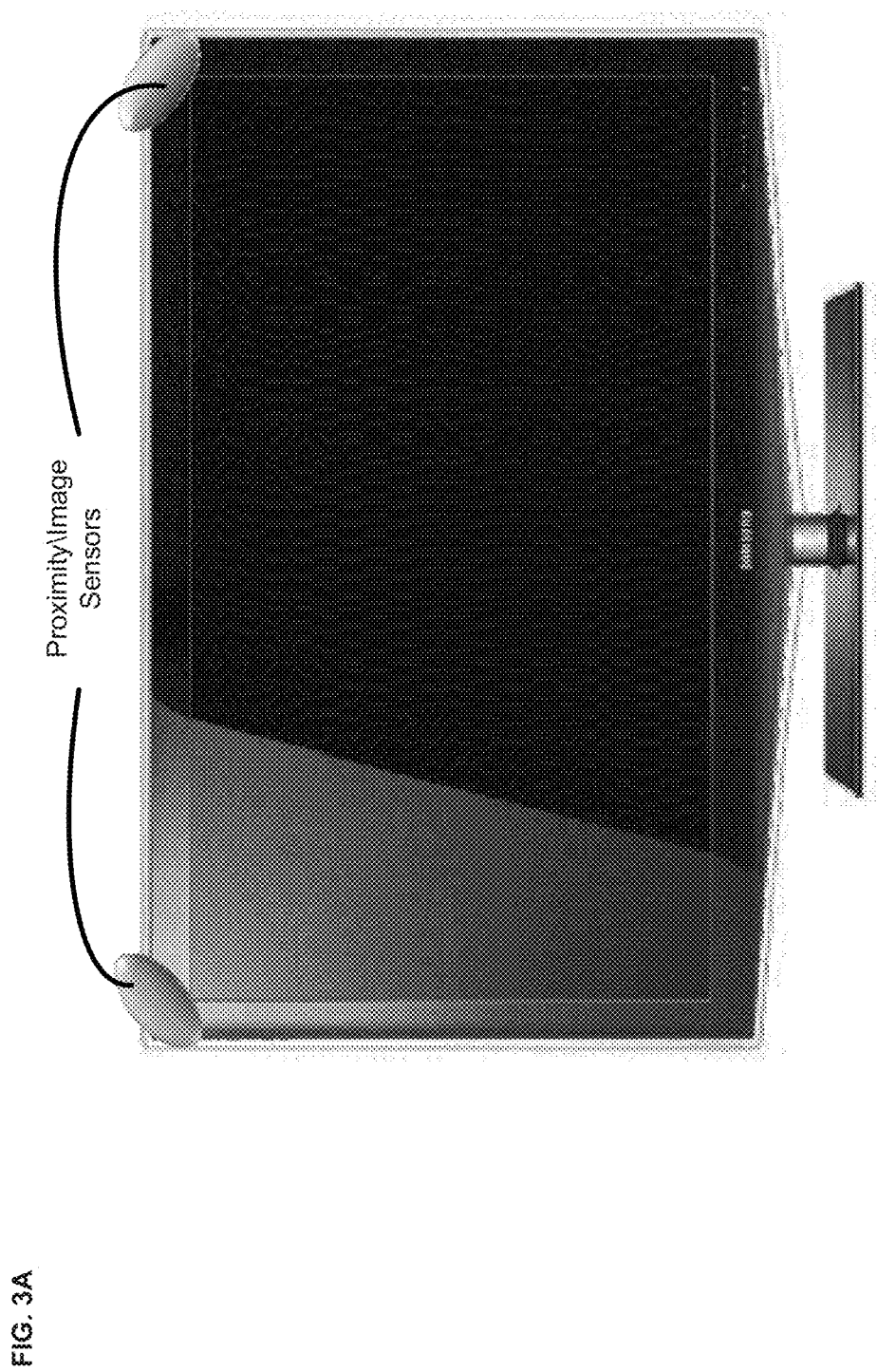
FIGS. 3A-3D are illustrations of exemplary configurations of sensors, reflectors and associated computational devices allowing monitoring of an active space adjacent to displays of the computational devices, all in accordance with some embodiments of the present invention.
Figure 3B:
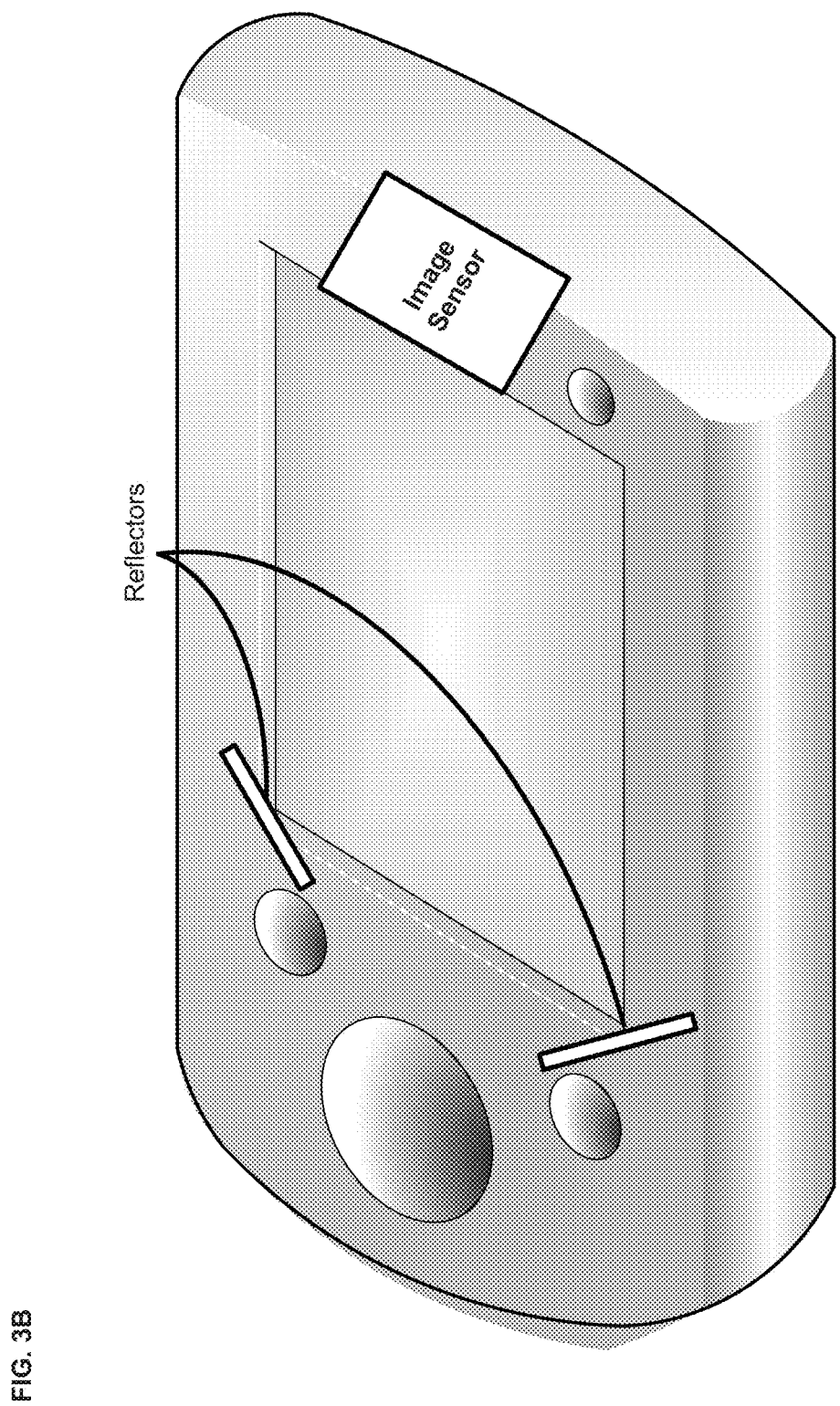
Figure 3C:
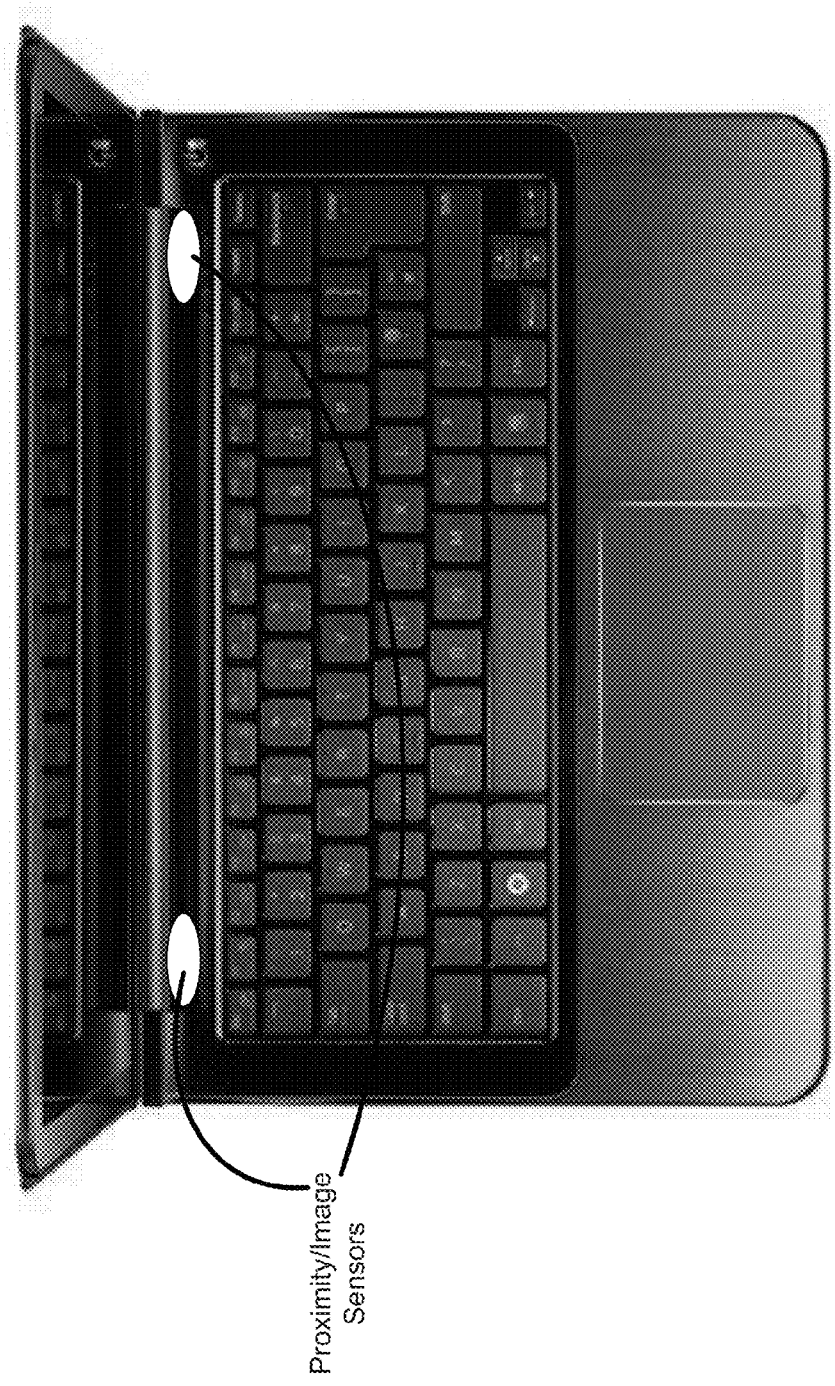
Figure 3D:
Figure 4:
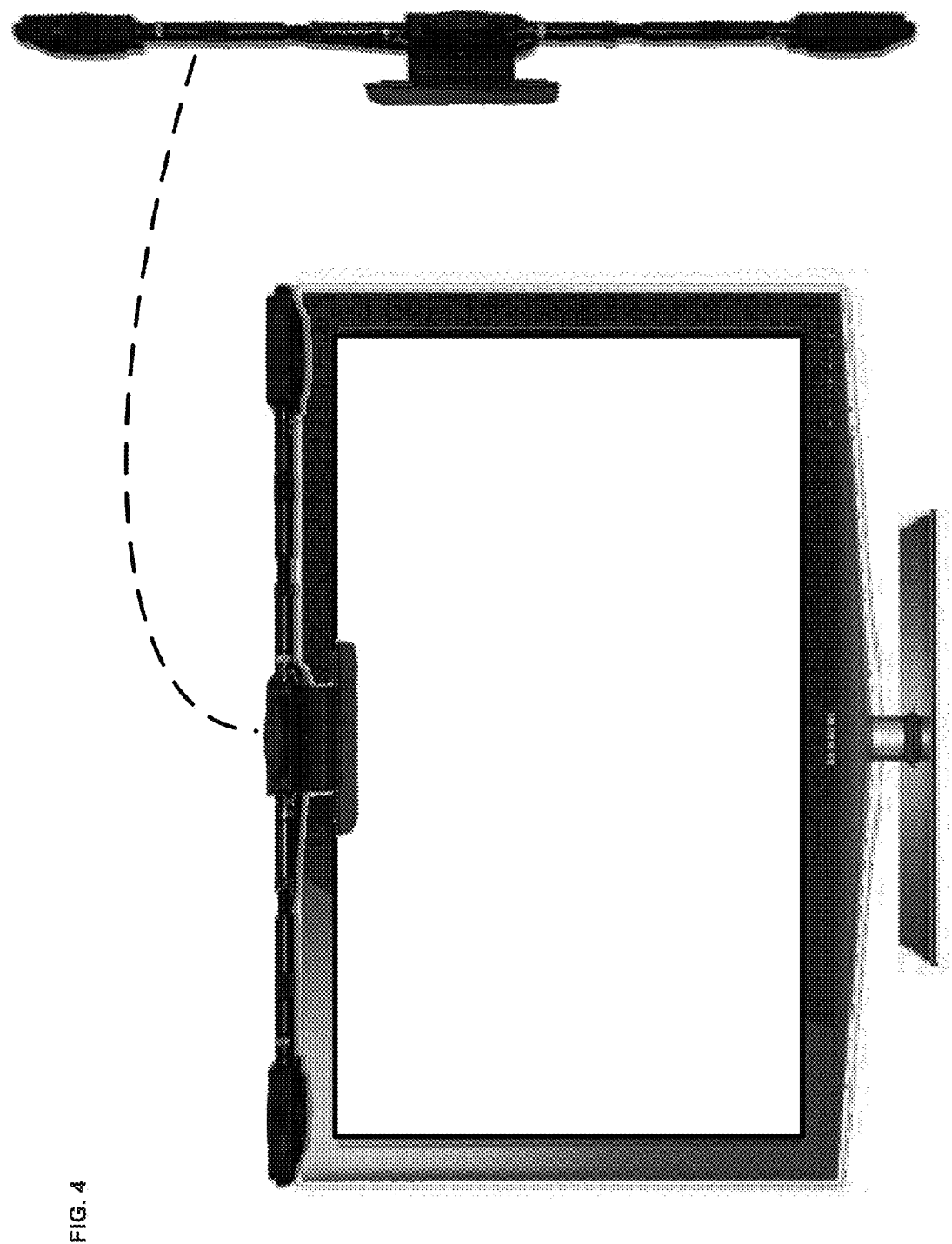
FIG. 4 is an illustration of an exemplary retrofit type sensor array designed to be associated with an existing display, and an illustration of the exemplary array associated with such a display, all according to some embodiments of the present invention.
Figure 5A:
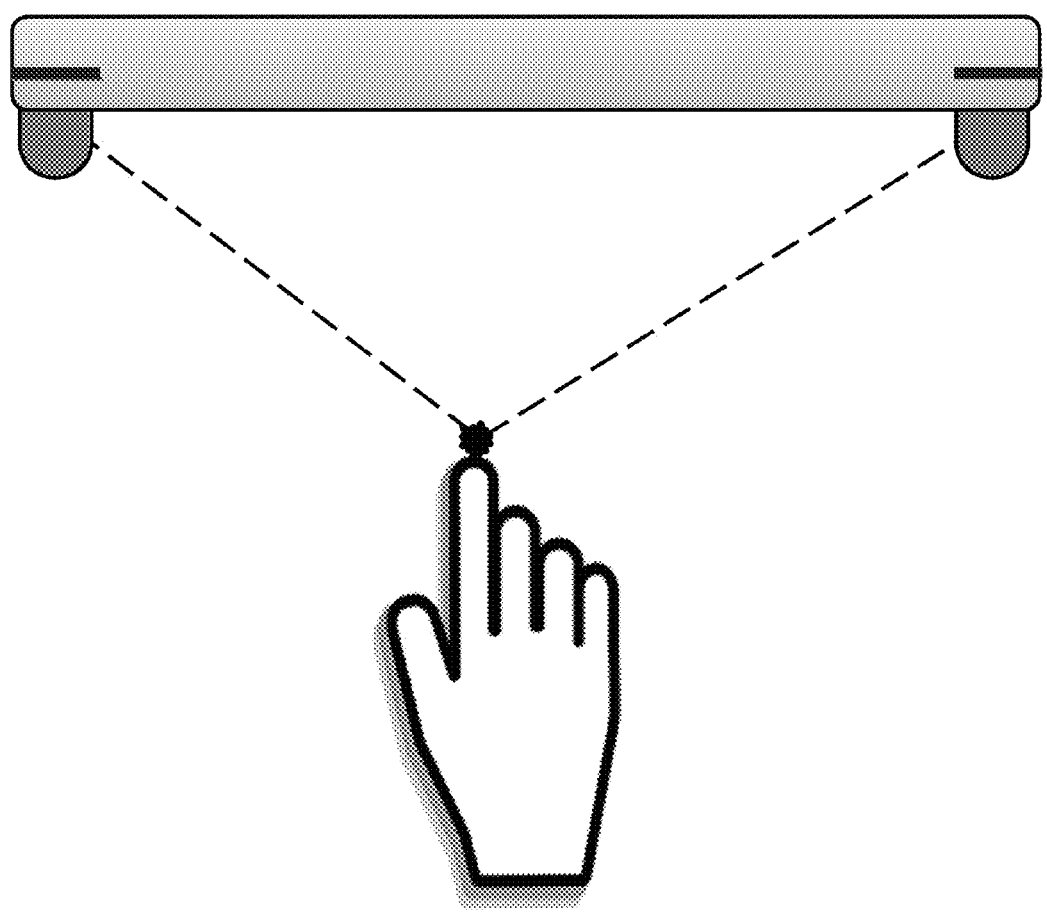
FIGS. 5A-5C are illustrations of exemplary configurations of sensors, reflectors and associated computational devices sensing position and orientation of a control object (a finger) within an active space adjacent to displays of the computational devices, all in accordance with some embodiments of the present invention.
Figure 5B:
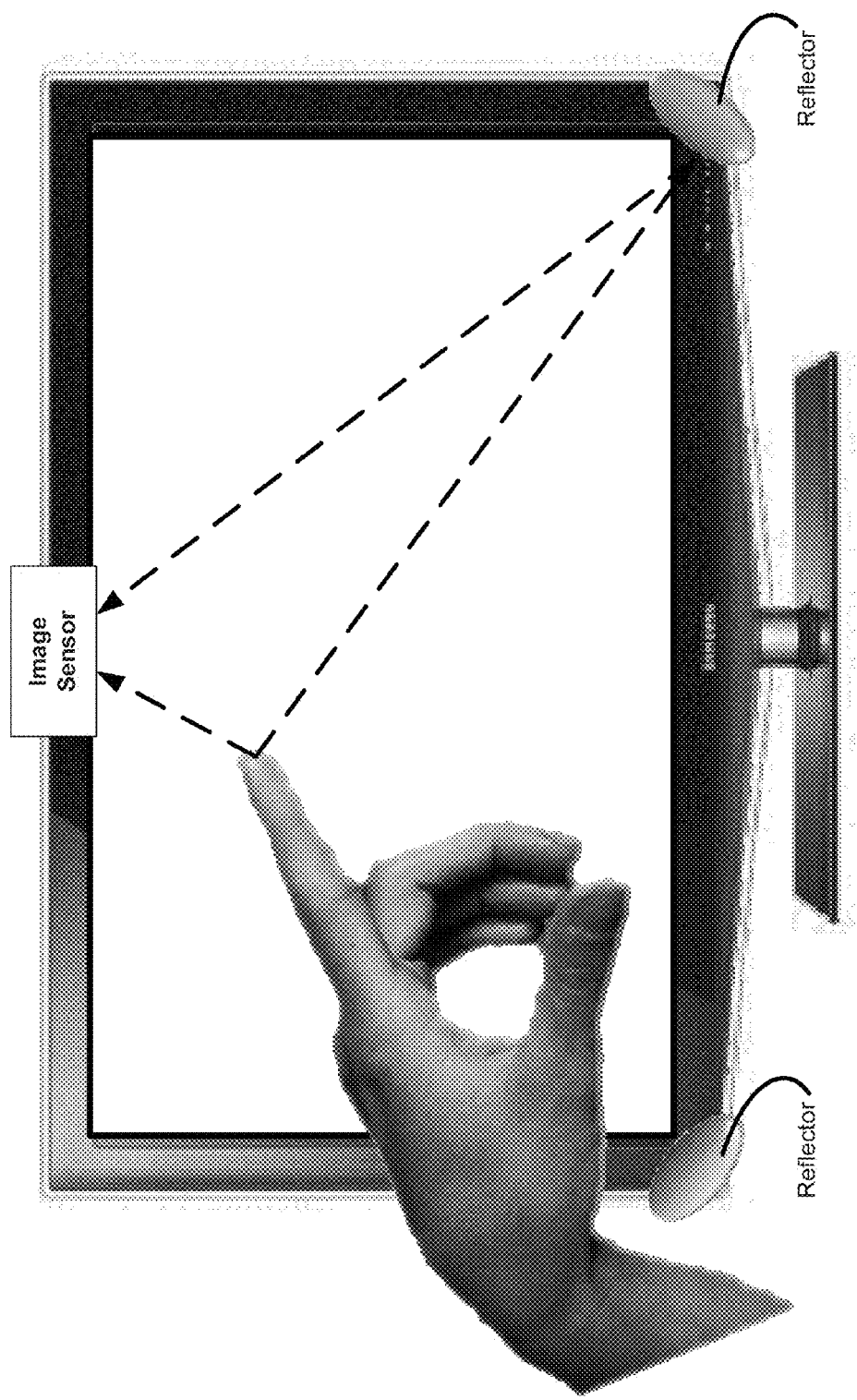
Figure 5C:
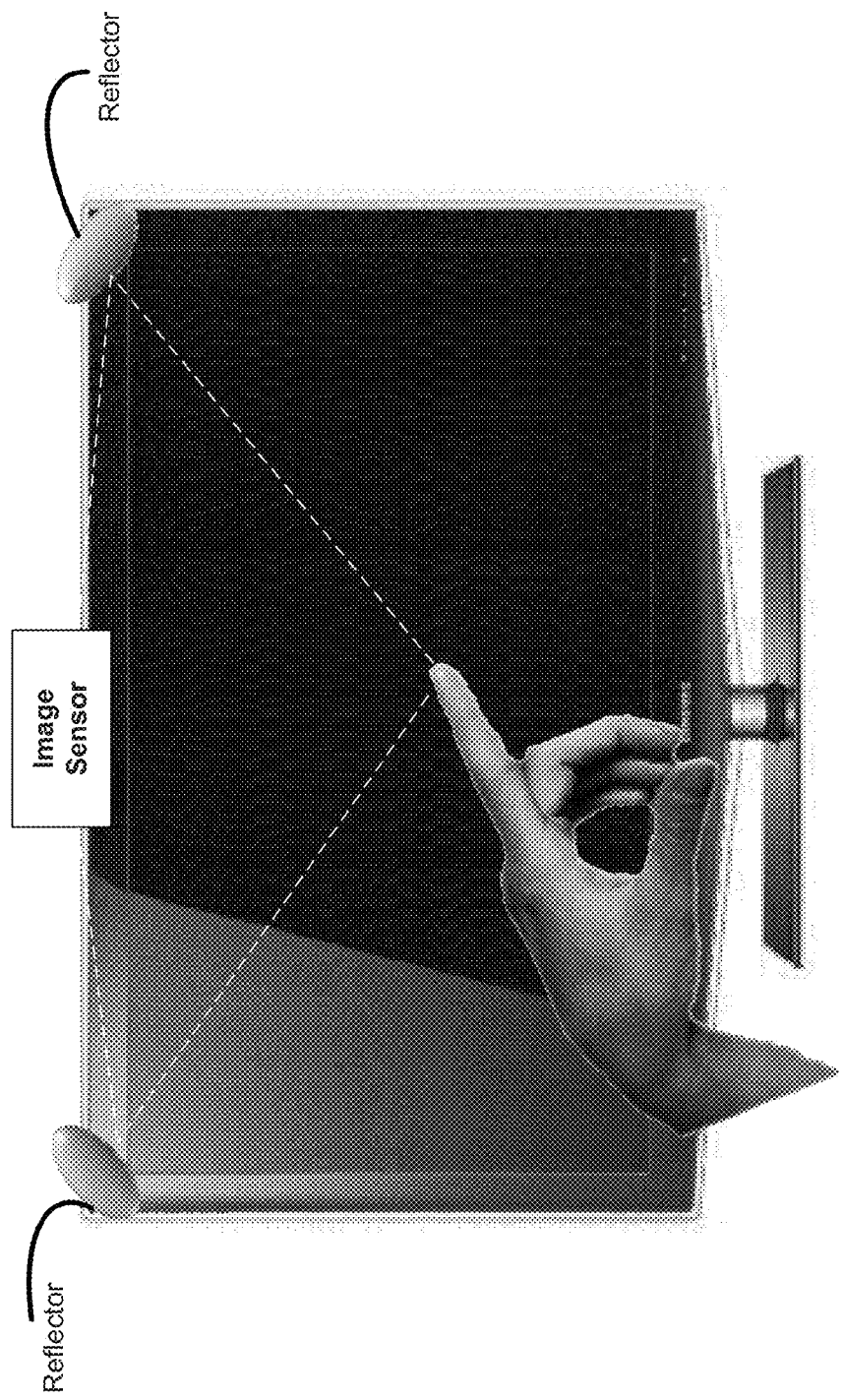

According to some embodiments, monitoring of an active space may be performed by the use of an optical assembly comprising one or more image sensors adapted to acquire image information from the active space via two or more optical paths [as shown in FIGS. 2, 3B, 3D, 4 & 5B-5C]. Position, orientation and movement of objects information within the active space may then be determined based on comparisons of the appearance of the objects from the different optical paths (viewing angles) [as shown in FIG. 2].

For example, a spatial region associated with an interface surface may be optically monitored through an optical assembly including: (1) at least one image sensor array (e.g. CCD or CMOS) functionally associated with the interface surface and positioned at or near a border segment of the interface surface, and (2) at least one optical reflector positioned at or near another border segment of the interface surface, which other border segment is within a line of site of the image sensor [as shown in FIGS. 2, 3B, 3D, 4 & 5B-5C]. Image processing logic, in the form of a dedicated image processing circuit or in the form of executable code running on a processor, may estimate position, motion and/or gestures of control objects (e.g. human fingers, pointer tools, etc.) on or near the interface surface by triangulating a location of the control objects relative to the interface surface using a composite image frame acquired by the image sensor, which composite image frame may be formed by light which was reflected or emitted from the control object, and which entered the at least one image sensor array (i) directly, and (ii) through at least one optical paths which includes at least one of the optical reflectors. Control logic tracking of control object position across multiple (substantially consecutive) acquired image frames may facilitate motion and/or gesture estimation.

According to further embodiments, other configurations of optical elements (sensors, reflectors, lenses and/or other optical elements) may be implemented to achieve optical monitoring of an active space via multiple optical paths. For example, image sensors and/or reflectors may be positioned within an associated computational device, interface surface and/or display, adjacent to an associated computational device, interface surface and/or display and/or within sight of an associated computational device, interface surface and/or display. The key being that the optical components optically monitor a given active space from multiple viewing angels and thus may accurately monitor the position, orientation and/or movement of control objects within the given active space.

Figure 11A:
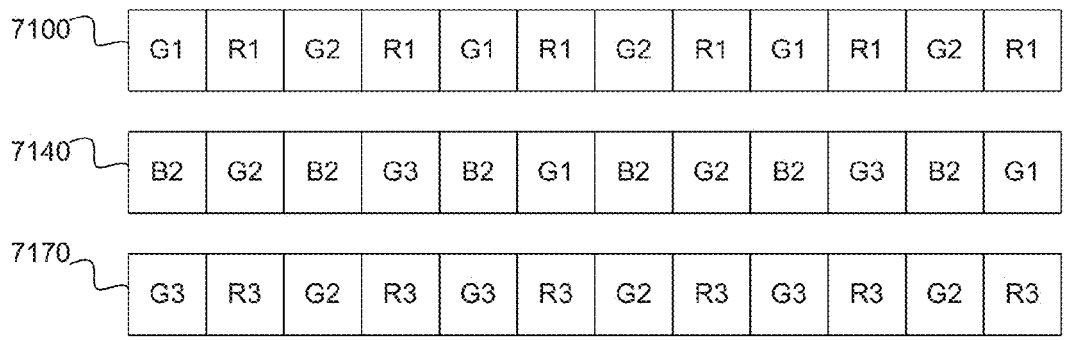
FIGS. 11A-11C are illustrations of exemplary optical filters, in accordance with some embodiments of the present invention.

According to embodiments, both the at least one image sensor and the at least one optical reflector may be positioned and oriented relative to the control surface so as to enable both to receive light reflected or emitted from one or more objects (e.g. fingers, pointing tools, etc.) on or near the interface surface. The at least one image sensor and the at least one optical reflector may be positioned and oriented relative to one another so as to facilitate the at least one sensor array to receive light from a given object on or near the interface surface both: (1) directly from the object, and (2) through an optical path including the at least one optical reflector (i.e. light from the object which bounces off of the at least one optical reflector before entering the sensor array) [demonstrated in FIG. 5B]. According to further embodiments, the at least one image sensor array may be positioned at or near the periphery of the interface surface and may be oriented such that at least a portion of the sensor's optical receive path: (1) is substantially parallel to the interface surface, (2) provides for a field of view including at least a portion of the interface surface, and (3) provides for a field of view including at least one optical reflector. According to further embodiments, a sensor array may have a native receive optical path which is parallel to the interface surface (e.g. the sensor is facing out of a plane parallel to the interface surface) and may include an optical reflector positioned above the interface surface and having a reflective surface in a plane substantially diagonal to the interface surface plane. According to yet further embodiments, the image sensor may include an electrically controllable optical filter. The optical filter may be a physical filter, for example composed of a color or polarization filter film, or the filter may be implemented digitally by digitally selecting and or separating color channels (e.g. color group pixel outputs) from the image sensor array [examples of filters are shown in FIGS. 11-12].

According to further embodiments, the at least one optical reflector may be positioned at or near the periphery of the interface surface and may be oriented such that at least a portion of the reflector's reflective surface may receive light from a region on or above the interface surface. At least a portion of the at least one reflector's reflective surface may reflect received light to the at least one sensor array. Optionally, at least a portion of the reflector's reflective surface may be perpendicular to the interface surface plane. Optionally, each of two or more optical reflector reflective surfaces may be coated with a different optical filter—for example, each may include either a different color filter or a different polarization filter, which filters may be electrically controllable. According to yet further embodiments, the reflectors may be functionally associated with actuators, and their position and/or orientation may be electrically controllable by a controller of the human machine interface system.

According to embodiments, there may be provided at least one illumination source such as, for example, an infrared light emitter. An illumination source according to some embodiments may be integral or otherwise functionally associated with either an image sensor and/or with a reflector. The at least one illumination sources may be positioned and oriented so as to illuminate control objects on or near the interface surface.

According to embodiments, there may be provided image processing logic (circuit or code) receiving image information (e.g. image frames) from the at least one image sensor array and adapted to estimate the position/location, motion and/or gesture of a control object on or near the interface surface. The image processing logic may include one or more feature recognition algorithms to recognize or detect a feature of a control object within an acquired image. Any and all feature detection techniques and algorithms known today or to be devised in the future may be applicable to embodiments of the present invention, and are hereby incorporated by reference. Optionally, the image processing logic may include background removal algorithms to remove and/or suppress features unrelated to a control object within an acquired image. Any and all background removal techniques and algorithms known today or to be devised in the future may be applicable to embodiments of the present invention, and are hereby incorporated by reference.

According to further embodiments, the image processing logic may include one or more triangulation algorithms for estimating a position of a given object (optionally: identified object) relative to the interface surface. The estimation may be based on instances of the given object within a composite image acquired by the at least one sensor array. The at least one triangulation algorithm may include parameters for factoring relative positioning and orientation of the at least one image sensor array relative to the at least one reflector. The at least one triangulation algorithm may include parameters for factoring relative positioning and orientation of the at least one image sensor array and/or the at least one reflector relative to a reference coordinate frame of the interface surface. According to embodiments, the triangulation algorithm may: (1) identify separate instances of a given control object (each instance acquired through a different optical path) present in an acquired composite image, (2) factor: (i) relative positions and orientations between the at least one image sensor arrays and the at least one reflector; and (ii) a size and/or position of each instances of the control object in the acquired composite image frame; in order to estimate a distance of the given control object from the at least one of the reflectors and/or from the at least one sensor array, and (3) factor a relative position between the at least one sensor array and/or the at least one reflector relative to one or more points of the interface surface reference coordinate frame in order to estimate the position of the given control object within the interface surface reference coordinate frame. Any and all (image based) triangulation techniques and algorithms known today or to be devised in the future may be applicable to embodiments of the present invention, and are hereby incorporated by reference.

According to some embodiments of the present invention, there may be provided an optical assembly for collecting image information from an active space, including a set of optical paths. An optical path according to some embodiments of the present invention may include one or more lenses, one or more reflectors and/or one or more diaphragm structures, where a given optical path's lenses, reflectors and diaphragm structures may be adapted to receive, direct and/or collect optical image information from an active space. Accordingly, two or more optical paths from the set of optical paths may receive, direct and/or collect optical image information from the active space from different viewing angles.

According to further embodiments of the present invention, each of the two or more optical paths may direct their respective received/collected optical image information onto an image sensor, which image sensor may be adapted to convert the optical image information into an image data set correlated to the optical image information (e.g. a digital image frame representing the collected optical image). According to further embodiments of the present invention, an image sensor may be adapted to produce a series of image data sets (i.e. series of digital image frames), wherein each image data set may be representative of optical information received/collected over a given period of time (e.g. 30 milliseconds).

Figure 8A:
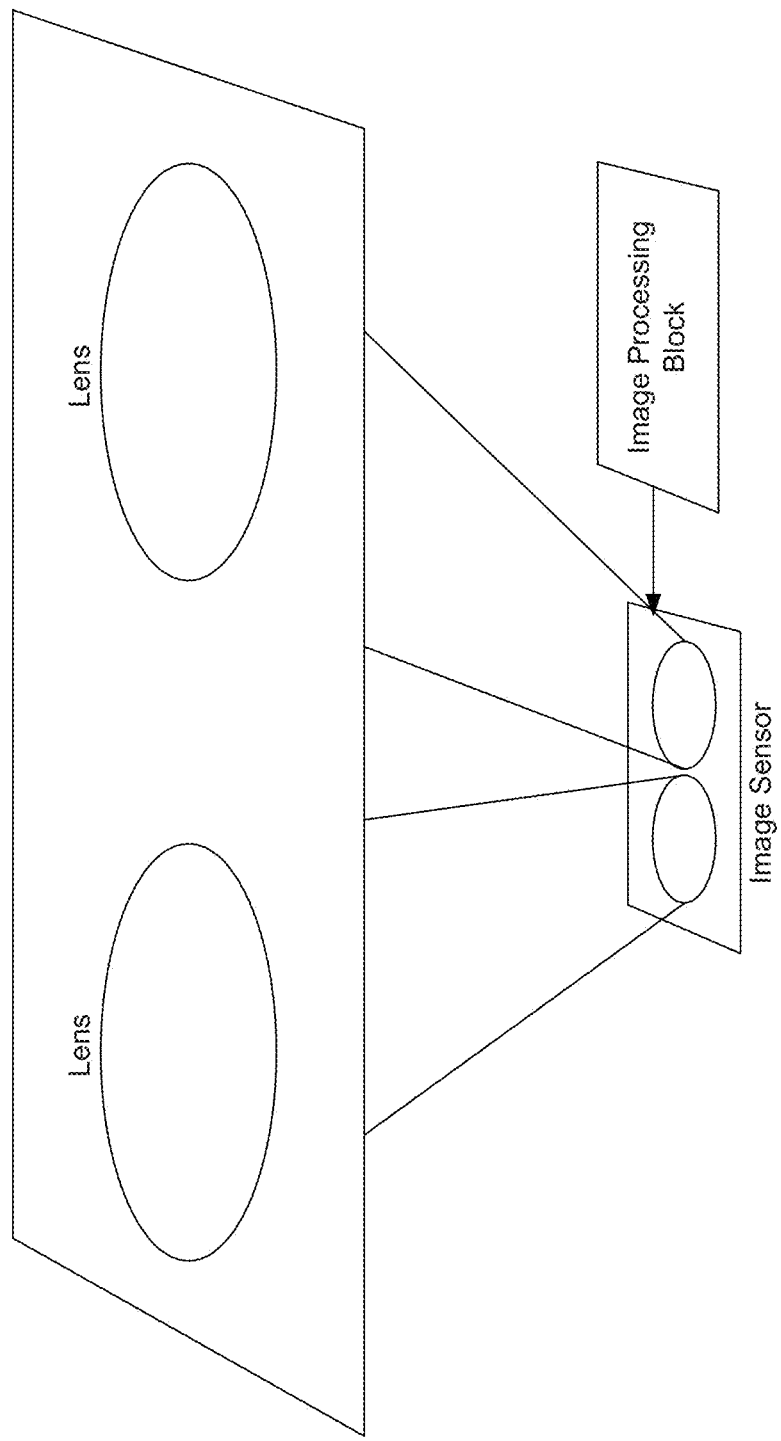
FIG. 8A shows a diagrammatic representation of an optical assembly according to some embodiments of the present invention where optical image information from two separate optical paths are projected onto separate areas of a common image sensor.
Figure 8B:
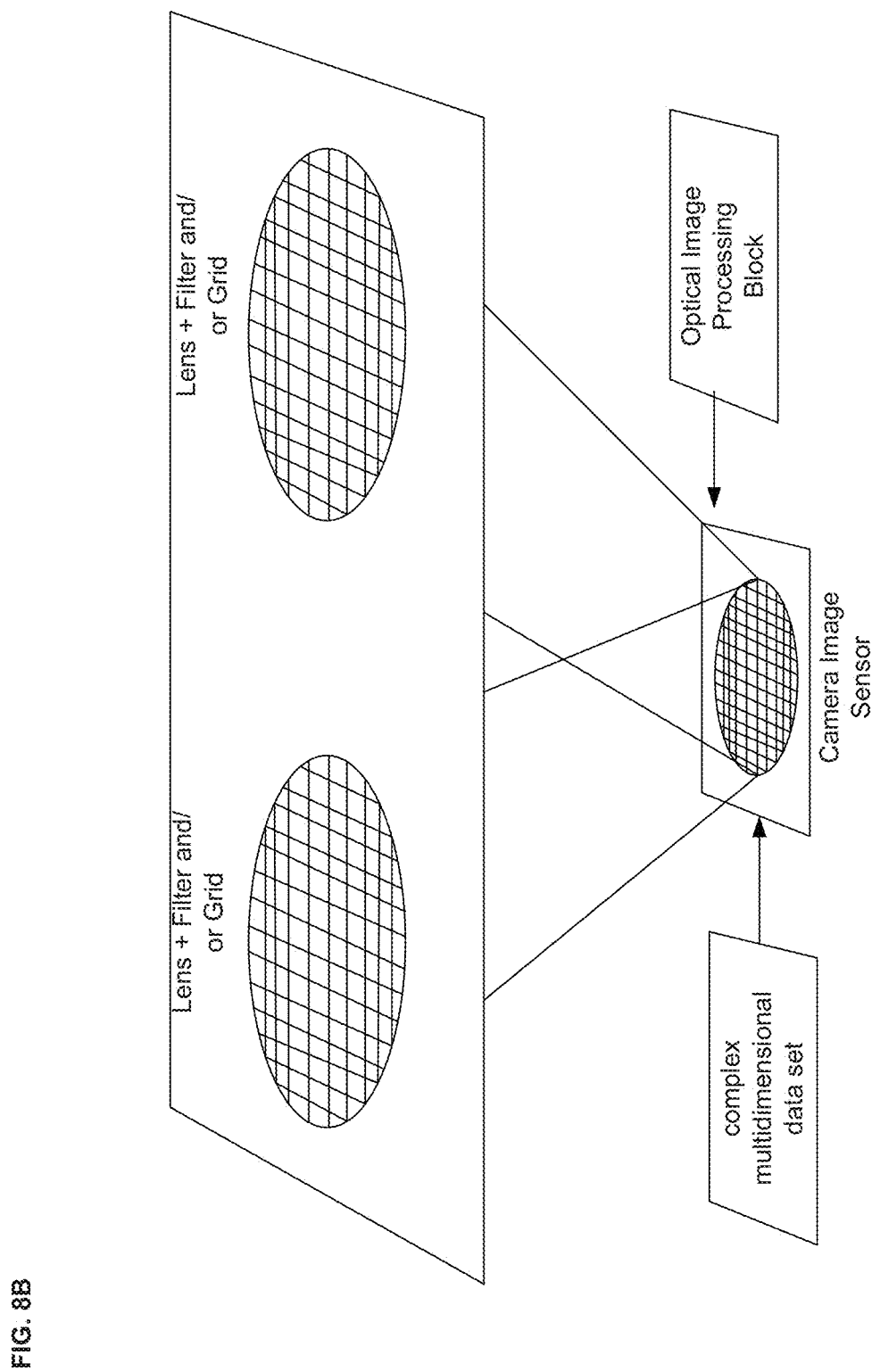
FIG. 8B shows a diagrammatic representation of an optical assembly according to some embodiments of the present invention where optical image information from two separate optical paths are projected onto a common area of a common image sensor.

According to some embodiments of the present invention, each of the two or more optical paths may direct its respective received/collected optical image information onto a separate image sensor, while according to further embodiments of the present invention, the two or more optical paths may direct their received/collected optical image information onto a common image sensor [see FIGS. 8A-8B]. According to embodiments of the present invention where a common image sensor is used by multiple optical paths, each optical path may either direct its respective collected image onto a separate portion of the image sensor [see FIG. 8A], or two or more optical paths may direct their respective collected images onto overlapping segments on the image sensor [see FIG. 8B]. According to even further embodiments of the present invention, two or more optical paths may direct their respective collected images onto a common segment of the image sensor, thereby optically encoding the images [see FIG. 8B].

According to embodiments of the present invention wherein received/collected optical image information from each of multiple optical paths is directed to a separate segment of a common optical sensor, image data produced from each separate optical sensor's segment may be considered a separate image data set (e.g. frame). According to embodiments of the present invention where two or more collected optical images are directed to a common segment on an image sensor (e.g. substantially the entire active/sensing area of the sensor), several methods may be used to produce a separate image data set associated with each of the directed optical images, said methods including: (1) time domain multiplexing, and (2) encoding/decoding functions.

According to embodiments of the present invention employing time domain multiplexing, an optical shutter (e.g. Liquid Crystal Display shutter) may be included as part of each relevant optical path. Time domain multiplexing may be achieved by opening only one given optical path's shutter during a given period, which given period is within an acquisition period during which the image sensor is to produce image data associated with the given optical path. By opening the shutter of each of the relevant optical paths in correlation with the image sensor's acquisition periods, multiple image data sets (i.e. image frames) may be produced, wherein each image data set may be associated with a separate optical path. According to further embodiments, an optical element, such as an adjustable reflector or shutter, may be positioned such that it may be used to alternate the optical image information arriving at the common image sensor area between the two or more optical paths, such that time domain multiplexing is achieved. For example, a rotating reflector may be positioned in front of the image sensor such that during the rotation of the reflector light is reflected to the sensor alternatingly from each of the optical paths.

According to embodiments of the present invention where optical image information received/collected by each of a set of optical paths is combined (i.e. optically encoded) on a common surface segment of the image sensor during one or more sensor acquisition periods, the optical sensor may produce a composite image data set that may include information relating to some encoded composite of the two or more collected optical images. An encoding/decoding function method or algorithm in accordance with some embodiments of the present invention may be used to encode the two or more collected optical images and decode the composite image data set into two or more separate image data sets, wherein each of the separate image data sets may be associated with and may represent collected optical image information from a single optical path.

According to some embodiments, each optical path may include a distinct optical element, such as a filter or grid [see FIG. 8B]. Accordingly, image information received via a given optical path may be distinct/distinguishable based on the effect of the distinct optical element on the light travelling through the given optical path. Furthermore, different light sensing elements may be used to sense the light arriving from each optical path. According to yet further embodiments, the light sensing elements used to sense the light from each optical path may be distributed upon a common image sensor area interleavingly.

According to some embodiments, a sensor assembly adapted to monitor positions, orientations and/or movements of control objects within an active space adjacent to an existing interface surface, as otherwise described in the present disclosure, may be provided (i.e. a retro fit system). These types of embodiments are demonstrated in FIG. 4. As can be seen, the assembly presented in FIG. 4, or other such assemblies, may be positioned in proximity to an existing interface surface (e.g. touchscreen) and thus the teachings of the present disclosure may be implemented in relation to an existing computational platform having an interface surface.

According to some embodiments of the present invention, there may be provided an image data processing block, implemented either on a dedicated data processor or on a programmable generable purpose processor. One or multiple image processing algorithms may be implemented or executed via the processing block. For example, in accordance with some embodiments of the present invention, the data processing block may be adapted to perform a decoding function of a composite image data set, and in accordance with further embodiments of the present invention, the processing block may be adapted to combine two or more collected images into a multidimensional (e.g. four dimensional) data set, wherein the multidimensional data set may include image data representing various features of elements/objects within the active space. For further example, in accordance with some embodiments of the present invention, an optical data processing block may be adapted to generate a complex multidimensional data set to be printed on the camera image sensor. In accordance with further embodiments of the present invention a data processing block may be adapted to extrapolate each of the subset of optical paths printed on the camera image sensor.

According to further embodiments of the present invention, there may be provided an image extrapolation block, implemented either on a dedicated data processor or on a programmable generable purpose processor. The image extrapolation block may extrapolate either from the multidimensional data set, from the originally acquired image data sets (i.e. frames) or from the encoded data set of the encoding/decoding function one or more types of derived data sets, wherein each extrapolated data set type may be associated with one or more features of elements/objects within the active space from which the two or more optical paths collected optical image information. Extrapolated data set types may include: (1) a depth map (i.e. z-channel or depth information of every pixel's-point in the common projection plain), (2) a holographic stereogram image of the common projection plain, (3) a stereo image of the common projection plain, and (4) one or more two-dimensional images, where each image may also be an approximated virtual view point of the common projection plain.

According to some embodiments of the present invention, each of the optical paths may include (1) one or more fixed and/or adjustable mirrors/reflectors, (2) one or more fixed and/or adjustable lenses and (3) one or more fixed and/or adjustable diaphragm structures. According to further embodiments of the present invention, the lenses and mirrors of two or more optical paths may be functionally associated (e.g. synchronized). According to yet a further embodiments of the present invention, the diaphragms on the two or more given optical paths having functionally associated lenses and mirrors may be adapted to adjust their configuration (e.g. aperture size and shape) so as to maintain a common image area between the given optical paths when the focus on the synchronized lenses is changed.

Figure 7:
FIG. 7 shows an example of an optical assembly according to some embodiments of the present invention.

Turning now to FIG. 7, there is shown an optical assembly according to some embodiments of the present invention. As visible from FIG. 7, the optical assembly has multiple optical paths, which paths may include lenses, mirrors and may also include a diaphragm structure behind each lens/mirror. The configuration of each optical path's diaphragms, lenses, mirrors and positioning of the optical sensor may define the viewing angle and area from which the optical path may receive optical image information. According to some embodiments of the present invention, two or more of the optical paths on the optical assembly may be configured to acquire optical image information from a substantially common area (e.g. an active space). The targeted area for each of the two or more optical paths may partially, substantially or totally overlap. The shape of each optical path's target area may be flat, spherical, cylindrical or any other shape which may be defined using optical elements such as lenses and mirrors.

FIG. 8A shows a diagrammatic representation of an embodiment of the optical assembly where optical image information from two separate optical paths are projected onto separate areas of a common image sensor. According to such embodiments of the present invention, each area of the optical sensor may correspond with an image frame. For example, if the image sensor outputs an RGB image (may also be in RAW data) from the entire sensor area, an image processing algorithm may parse the image into separate frames.

FIG. 8B shows a diagramic representation of an optical assembly, according to some embodiments of the present invention, where optical image information from two separate optical paths are projected onto a common area of a common image sensor. According to some of these embodiments, a dedicated lens, an optical filter and/or a grid associated with each optical path may provide for the optical encoding of the optical image information received by each of the optical paths, such that although two or more optical images may be simultaneously printed onto the same area of an image sensor, the two images may later be extrapolated from the sensor's data set (may also be RAW data) using an image processing algorithm, according some embodiments of the present invention.

FIG. 9A shows a symbolic diagram of an optical assembly and image processing which according to some embodiments of the present invention produces a series of digital image data sets (e.g. 2D image frames). According to some embodiments of the present invention, the frames may be produced by one or more image sensors. If two or more optical paths direct their respective received/collected optical image information onto a separate area of a common image sensor or onto separate sensors, separate image data sets (i.e. image) frames may be produced directly by the image sensors.

When separate image frames of a common scene are simultaneously produced through separate optical paths, the separate image frames may be used to generate a multidimensional image data set, for example a three dimensional (3D) depth map representing the scene. Examples of calculations associated with calculating depth information on a pixel by pixel basis (disparity maps) are shown in FIGS. 9B and 9C, and a detailed explanation is given below.

According to some embodiments of the present invention, a color may also be associated with each of the pixels in the 3D depth map, using one of several methods. The multidimensional image data set may be extended to yet a further dimension by, for example, using multiple sets of images taken at different times to add a time variable to a colorized or non-colorized 3D depth map, thereby producing a 4D depth map. According to some embodiments of the present invention, as will be described below, a 3D depth map may be generated from a single optically encoded image data set.

Figure 9B:
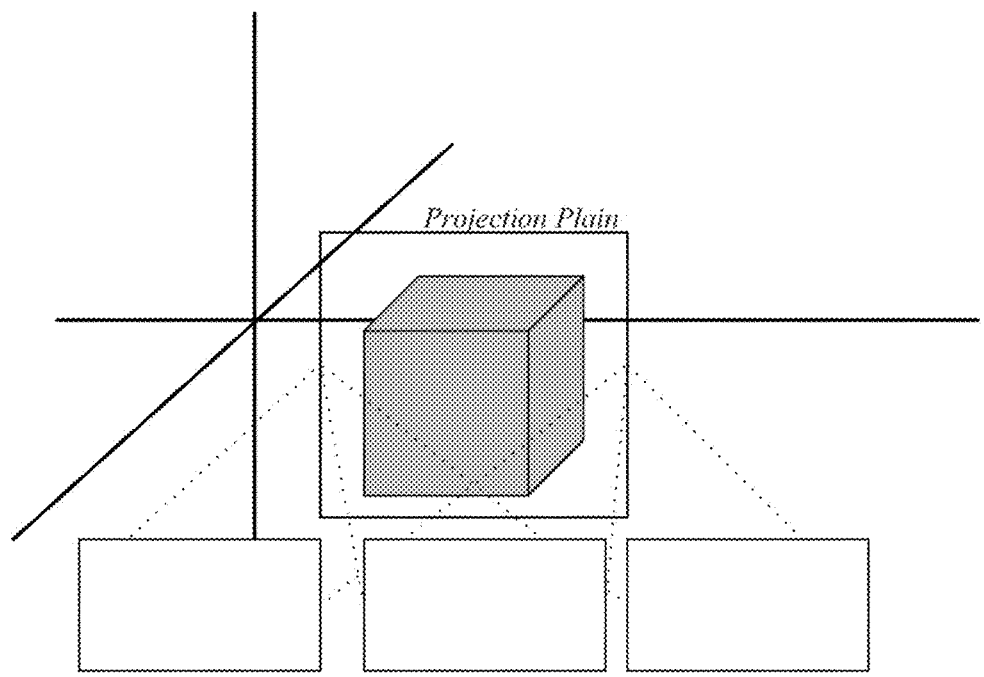
FIG. 9B shows a symbolic diagram depicting multiple images being generated from a multidimensional image data set, according to some embodiments of the present invention.
Figure 9C:
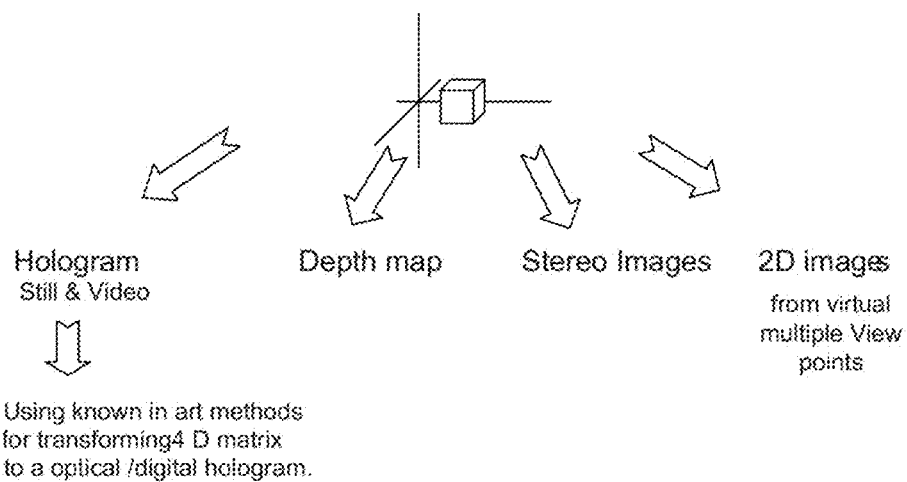
FIG. 9C shows a symbolic diagram depicting various image related data sets being derived from the multidimensional image data set, according to some embodiments of the present invention.

Turning now to FIGS. 9B and 9C, there are shown symbolic diagrams depicting multiple images and image related data sets being derived and/or extrapolated from a multidimensional image data set according to some embodiments of the present invention. As is described further below, ray tracing, pixel color interpellation and other image processing methods may be used to convert a multidimensional image data set into a variety of image data types. According to further embodiments of the present invention, certain image data types may be generated directly from acquired image frames.

Figure 10A:
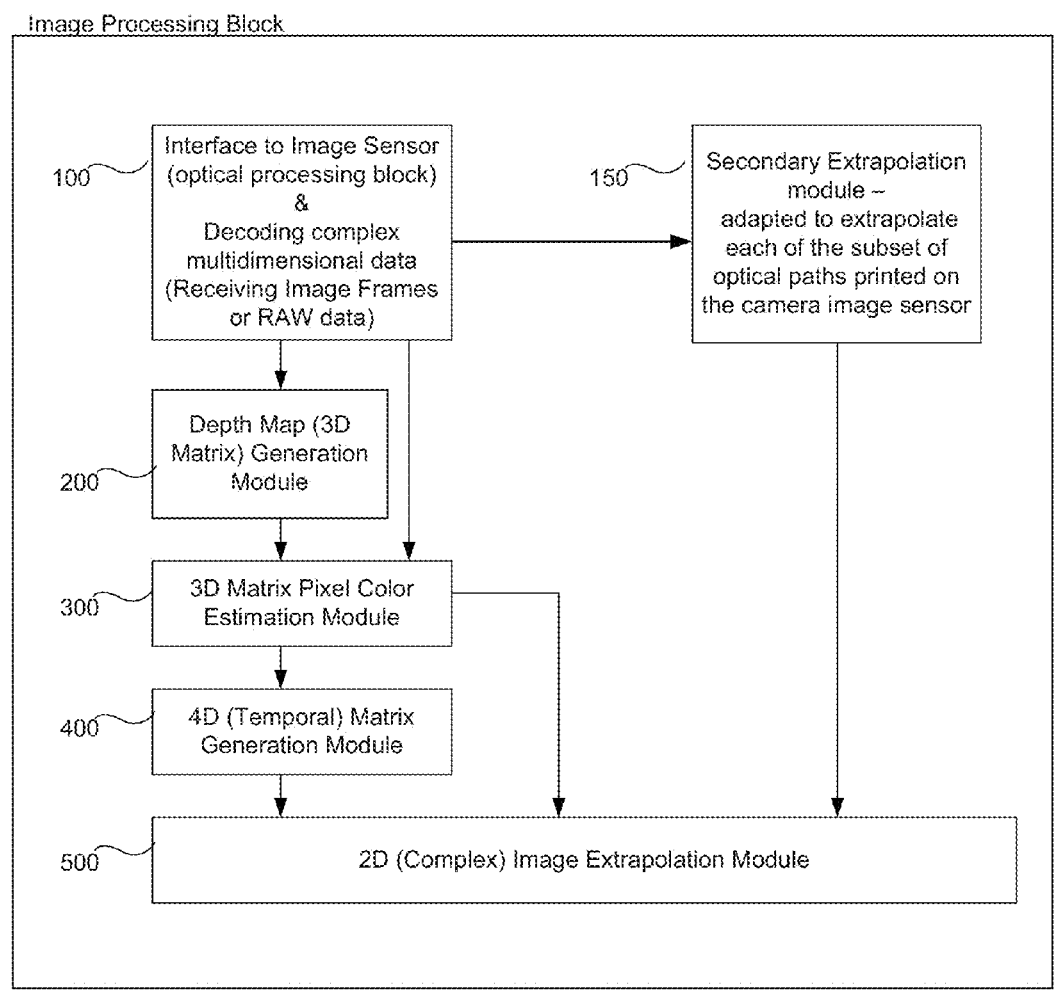
FIG. 10A is a functional block diagram of an exemplary image processing block, according to some embodiments of the present invention.
Figure 10B:
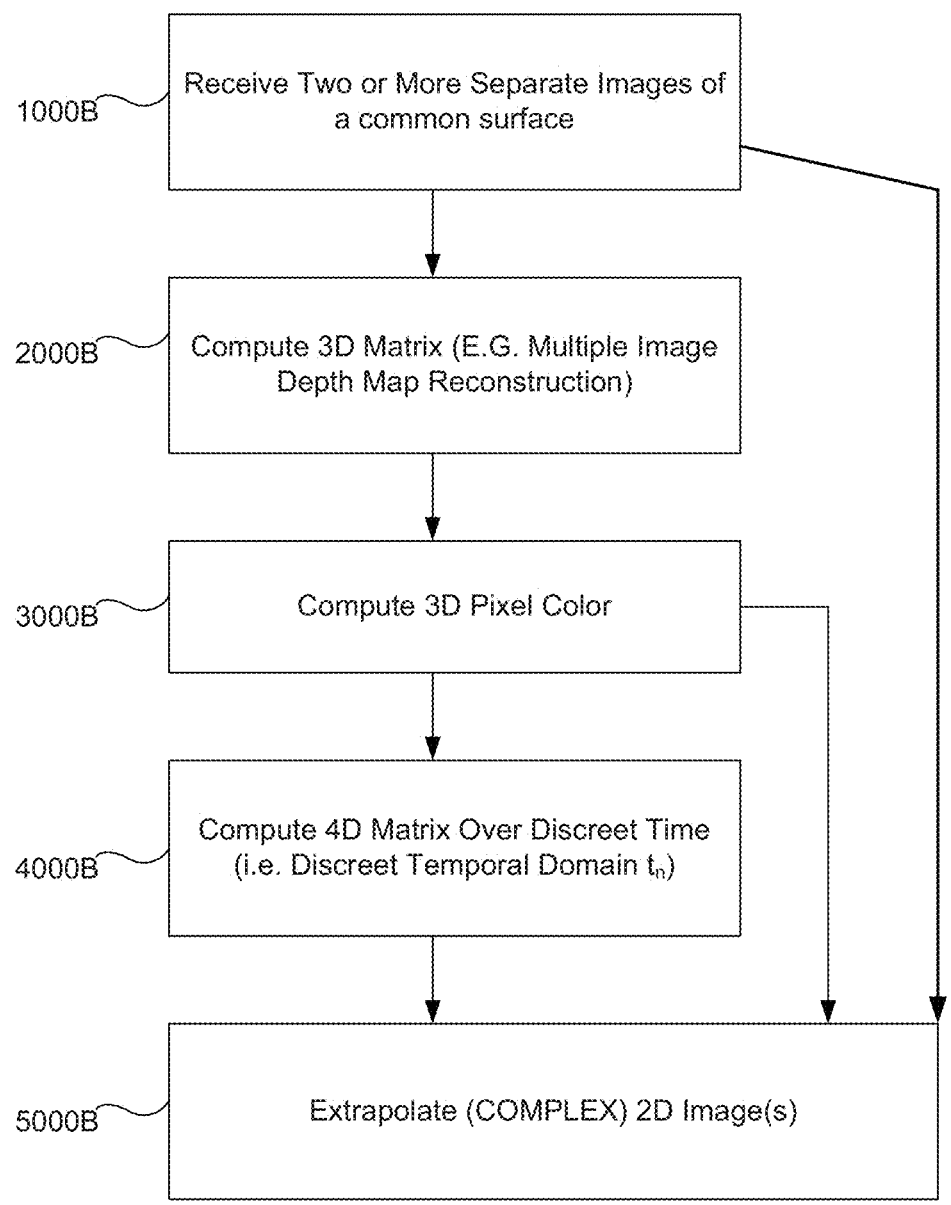
FIG. 10B is a flowchart including exemplary steps of producing one or more multidimensional image data sets from two or more acquired image frames, according to some embodiments of the present invention.
Figure 10C:
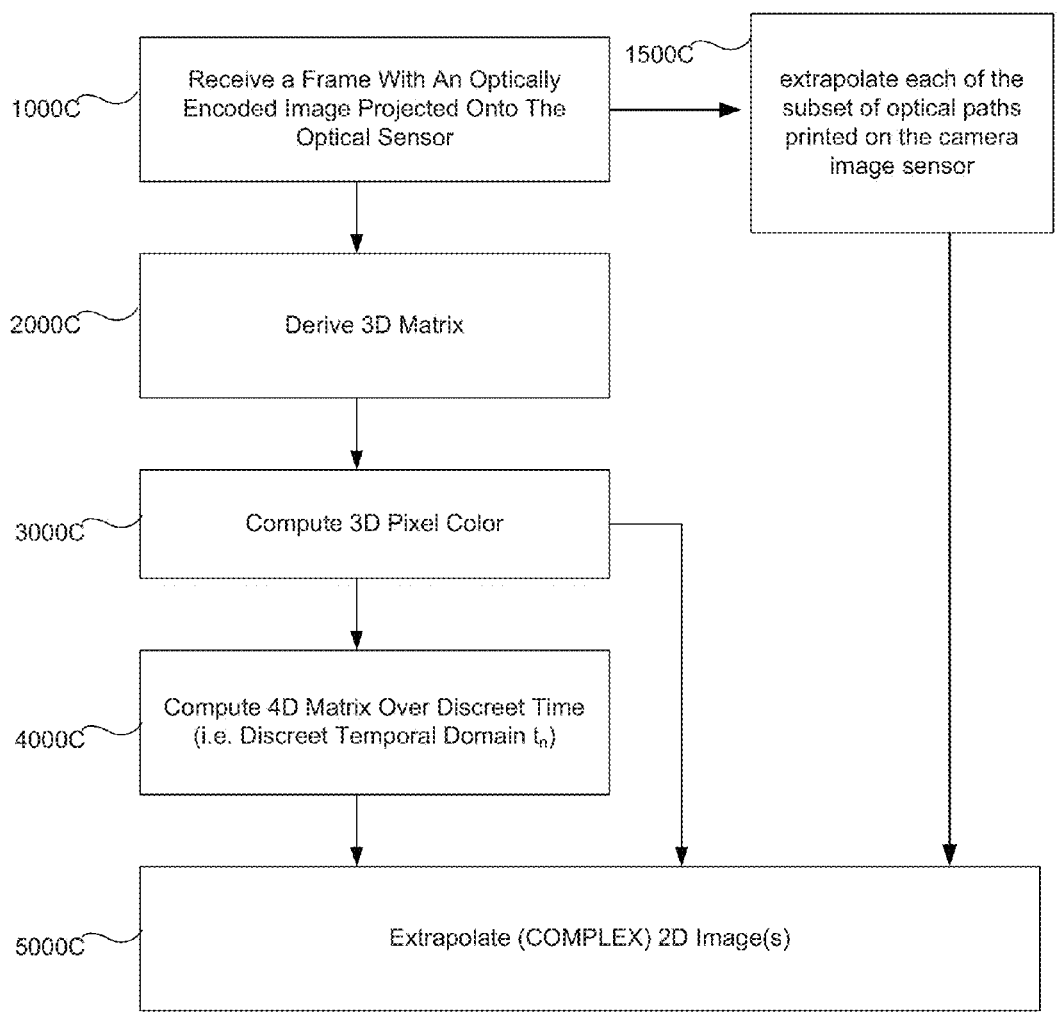
FIG. 10C is a flowchart including exemplary steps of producing one or more multidimensional image data sets from an optically encoded image frame, according to some embodiments of the present invention.

Turning now to FIG. 10A, there is shown a block diagram showing an image processing element/module according to some embodiments of the present invention. The operation of the various elements of FIG. 10A shall be described in conjunction with the steps of the methods illustrated in FIGS. 10B and 10C, wherein FIG. 10B shows a flow diagram consisting of the steps of producing one or more multidimensional image data sets from two or more acquired image frames according to some embodiments of the present invention, and FIG. 10C shows a flowchart consisting of exemplary steps of producing one or more multidimensional image data sets from an optically encoded image frame according to some embodiments of the present invention.

The received image information may either represent separate image frames (step 1000B) or RAW data, where each frame is generated from optical image information coming from a separate optical path, or the received image information may be an optically encoded image data set (step 1000C) including optical image information from multiple optical paths mixed onto a common area of an optical sensor.

According to some embodiments of the present invention, data received by element 100 may be directed towards a secondary extrapolation module (denoted as element 150). The secondary extrapolation unit may be adapted to extrapolate each of the subset of optical paths printed on the camera image sensor (step 1500C), or may be adapted to directly extrapolate (complex) 2D image(s) (step 5000B) as explained below.

When received image information is in separate frames, a Depth Map Generation Module 200 may generate a (3D) depth map (step 2000B) using one of various depth extraction algorithms, including point by point disparity map calculations.

According to some embodiments of the present invention, received image information may be optically encoded (step 1000C) such that a (3D) depth map may be derived (step 2000C) without having to perform considerable calculations, in which case the Interface to Image Sensor (optical processing block) 100 may be adapted to generate the depth map.

A Color Estimation Module 300 may interpolate a color for each of the points in the depth map (steps 3000B and 3000C). Various color interpolation or estimation methods, including the one described below, may be used.

A 4D matrix generation module 400 may use data associated with multiple depth maps, produced based on images acquired at different times, to generate a multidimensional image data set (steps 4000B and 4000C) which may include time as one of the dimensions.

An image extrapolation module 500 may generate, either from the extrapolated subset of optical paths, in conjunction with the secondary extrapolation module 150, or from a 4D data set, one or more image data types (steps 5000B & 5000C) including simple 2D images from various view points, complex 2D images with encoded depth information, and various others which are described below.

The following text contains examples of various algorithms and methods according to some embodiments of the present invention.

The following algorithm enables simultaneously optically encoding together on a single capturing sensor (e.g. CCD) multiple different images (up to full sensor resolution for each image), and decoding said multiple images without losing resolution for each of said images. The algorithm may input optically acquired images or multiple different sources (e.g. cameras, where the encoding may also be digital).

According to some embodiments of the present invention, a high level algorithm may comprise:
1. Encoding: Using Optical/image processing means.
2. Printing images on digital sensor/frame/data stream.
3. Input complex data from digital sensor/frame/data stream.
4. Decoding complex data, 4D Matrix Reconstruction
5. Output According to some embodiments of the present invention, the Encoding step may comprise:
a. Input: multiple optically acquired images (e.g. Holo stereo capturing device) or input images from multiple sources (e.g. cameras).
b. Encoding said images, using optical means or image processing means.

According to some embodiments of the present invention, printing images on a digital sensor step may comprise simultaneously projecting said encoded images onto a digital sensor or, simultaneously printing said encoded images as a single frame or any suitable data stream.

According to some embodiments of the present invention, the input complex data step may comprise: Input images from digital sensor or, Input images from data stream.

According to some embodiments of the present invention, the steps of decoding complex data may comprise:
1. Direct access to information in the complex multidimensional data set,
2. Extrapolate each of the subset of optical paths or multiple images from said encoded data.
3. Reconstruct depth maps, 4D dimension matrix
4. Reconstruct 3D color.
5. Extrapolate complex data sets The following text describes an example for an encoding decoding reconstruction and compression algorithm. The encoding decoding reconstruction and compression process may be done on images acquired from multiple optical sources where the encoding process is done optically, or from multiple sources such as cameras having no direct link to the holo-stereo capturing device, where the encoding process is done using image processing tools.

We propose a method and apparatus for "digital holography of incoherent light encoding and decoding", reconstructing a 3 dimensional/holographic image within an N dimensional matrix (for the following examples we will use a 4D matrix) from optically acquired 2D multiple images or from ordinary cameras (The "input data"), several projections of a unified projection frame (e.g. surface) illuminated by incoherent light, from different points of view. The encoding process of the input data may be done by optical means or digital means over space-time, to yield a 2D complex function, which is then optically printed on a digital sensor, or computationally processed as a frame or any other form of data stream.

According to some embodiments of the present invention, the decoding and reconstruction process may occur in two stages. The first stage may be decoding, performed as the quantized complex 2D function image is loaded into memory, holding a 3D structure or being filtered in to its original encoded particles (e.g. two images). The second stage, de-quantization, reconstructs the 4D matrix.

The final part of the system may be a real time image creator given the requested data and geometry (e.g. a 2D slice of the 4D matrix). This is a real time rendering model.

According to some embodiments of the present invention, image processing algorithms may also extrapolate data directly from the decoded data (e.g. 3D extraction of a single point in the image or a depth map) and to view one of the decoded images, without reconstruction of a 4D matrix.

In stereogram photography, we record several pictures of a scene (e.g. surface) from different points of view. The encoded complex 2D function may be reconstructed into a computer generated holographic stereogram—our 4D matrix, reconstructing the original three dimensional projection frame. This means that the image may be 3D reconstructed in the vicinity of our 4D matrix, in the horizontal (X) vertical (Y) depth (Z) and time (t) image axis. Consequently, the desired output may be extrapolated to any suitable dedicated means.

To summarize the process, a real world 3-D projection frame is captured by two or more 2D images from several angles. These images are encoded to a complex 2D function as a single frame. The decoded projections of the scene may be computed to a 4D computer generated matrix also extrapolating each of said projection angles, holographic stereogram, depth map, depth perception (stereoscopy) and multiple new 2-D matrix projection angles along X,Y,Z. 4D Matrix Construction and Color Separation methods.

A 2D image is a 2D slice of a 4D light field over time. Reconstructing a light field over time from a set of images corresponds to inserting each of the 2D light field slices into a 4D light field representation over time a 4D matrix. Similarly, generating new views, depth values and so on corresponds to real time extracting and resampling a slice of different data and different views.

This requires that the 4D matrix will properly resample each slice rays intersection representation to avoid distortions in the final image data. This process is the 4D data reconstruction.

Alignment of a pair of images from two adjacent camera/image locations on a 2D plane; a given point will project to different locations, potentially several pixels apart, in these two images. The distance between the two projected locations is called the stereo disparity. Extending this idea to multiple camera locations produces a sequence of images in which the object appears to jump by a distance equal to the disparity.

Continuing with this idea, each point in the real world 3D projection frame, holds a certain color, we can define as our absolute color, represented in the multiple images on different 2D projections, and following the given conditions this absolute color will be overlaid with distortions creating "color disparity" from the relative points' color and the absolute color. In the 4D matrix, we will strive to reconstruct these points' absolute color. Different angles exposed to the same point will preserve this color with given distortions such as angles, different horizontal positioning in the image, different lighting, optical distortions and so on. But, given the fact that all projections of the same point are a percentage of the absolute color of that point's color in reality, we can reconstruct each point's color, interpolating the point's color from the different angles, targeting to reconstruct the 3D point color as best as can be to the original absolute color of each point. This process enables compression of multiple images while preserving the basic rolls for practical real time compression:

Data Redundancy.

A good compression technique removes redundancy from a signal without affecting its content. Our method enables the 3D interpolation of a point from multiple views enabling a complex 2D function to avoid multiplication of the same data from multiple images.

Random Access.

Most compression techniques place some constraint on random access to data. Predictive coding schemes further complicate random access because pixels depend on previously decoded pixels, scanlines, or frames. Our method enables direct random access to any given point in space and time.

Computational Expense.

Our compression scheme of the 4D matrix enables quickly encoding transferring and decoding said images without hardware assistance on the receiving side, while consuming minor computational means.

Figure 6:
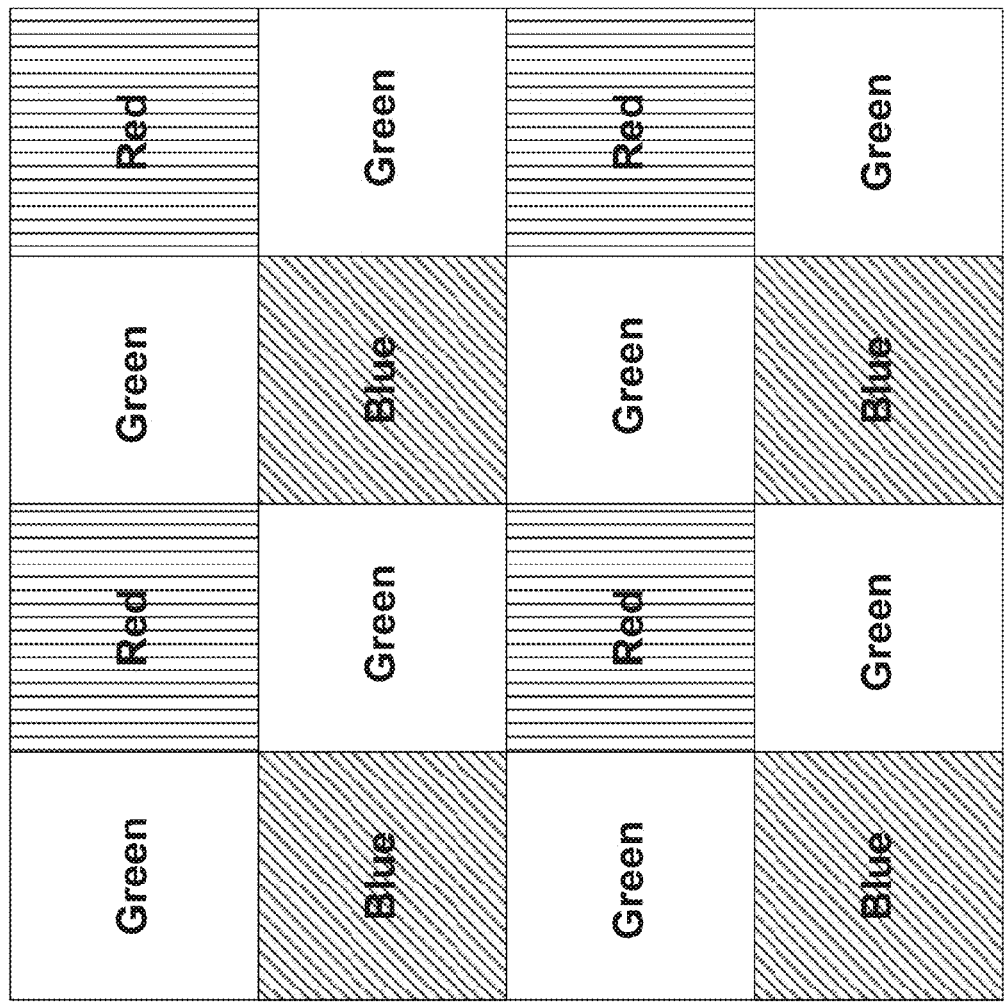
FIG. 6 shows an example of a Bayer filter, according to some embodiments of the present invention.

Exemplary Algorithm:

The following exemplary algorithm assumes the case of 3 images taken from 3 lenses (FIG. 9A elements 150A, 150B and 150C) of the holo-stereo capturing device; a single CCD (some cameras have 3CCD array one for each color or CMOS) and Bayer filter (FIG. 6).

The encoding methods may alter pending on the overall settings (input images, optical configurations, 3CCD, CMOS, fps and so on). It should be understood by those skilled in the art that it does not change the process of the encoding, decoding, reconstruction and compression algorithm.

Figure 14:
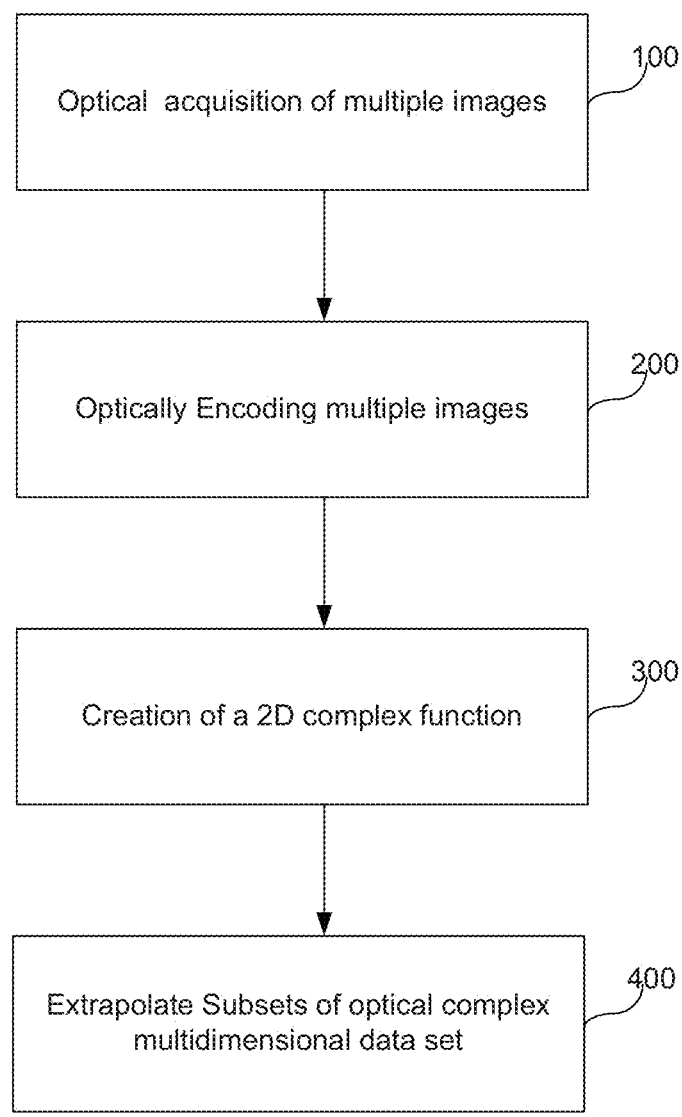
FIG. 14 is a flowchart including exemplary steps of an image processing algorithm, according to some embodiments of the present invention.

According to some embodiments of the present invention, an encoding/decoding reconstruction and compression algorithm may comprise the following steps and may be described in conjunction with FIG. 14 and FIG. 9A:

1. Optical Encoding:
1.1 Input: multiple optically acquired images (FIG. 14 step 100, images may be acquired using elements 150A, 150B and 150C shown in FIG. 9A, wherein the common scene is denoted as element 100 of FIG. 9A).

Following the process of optical acquisition, as described earlier, the holo-stereo device may now optically hold multiple images in time t'.

1.2 Optically Encoding said images, using optical means (FIG. 14 step 200, the encoding may take place in element 200 (Optical processing block) in FIG. 9A).
1.3 Creation of a 2D complex function that holds the information from the multiple optically acquired images (FIG. 14 step 300, element 300 in FIG. 9A)
1.4 Extrapolate subsets of optical complex multidimensional data set (FIG. 14 step 400, the extrapolation may take place in element 400 (Image processing Block) of FIG. 9A)

The Encoding algorithm (i.e. optical process) itself may vary (e.g. encoding using color, Fourier, Diffraction, Fresnel, Spatial etc), and is not limited to a specific configuration, the following example is not a limiting one.

Following are Three Exemplary Optical Encoding Methods—Denote:

Image 1=I1, its color: R1G1B
Image 2=I2, its color: R2G2B2
Image 3=I3, its color: R3G3B3

The encoding in this example may be the following:

Method 1:

Projecting images through dedicated filters such that the green color may enable disparity map reconstruction. As it is best to have the same color enabling disparity map construction of multiple images (different colors from different images may not be accurately matched), and as a CCD consists of ½ Green, ¼ red ¼ blue, and disparity in horizontal parallax is done on horizontal vectors, we may use the green in the rows to enable initial disparity maps. The encoding may be in the form of projecting said input images through optical filters such that said images are projected on said CCD as shown in FIG. 11A, Line 1 (7100), Line 2 (7140) and Line 3 (7170), wherein red color is denoted by "R", blue color is denoted by "B", and green color is denoted by G.

Some color points may be missing on different images, their signature can be printed on the digital sensor using the physical attributes of the digital sensor. We may also use different spatial deviation on the CCD.

Method 2:

Enhancing said images optical signature on the digital sensor using the reaction of each CCD receptor to light, or the amount of data each pixel may hold in a single frame or any means of data transfer.

The number of photons on each photo sensor on the CCD may be interpreted to digital values from 0 to 22 using 12 bits for each sensor in some RAW files and even higher bit for each sensor in others.

Method 2 exploits the potentially larger bandwidth of each photo sensor in terms of digital light printing, as if to exploit the total CCD information more than the usual output value of the pixel (mostly 8 bit per pixel per each color). Using filters to optically vary the values of image points during the projection step on the CCD sensor, larger values may be collected and later interpreted to digital terms in a 12 bit array or more. Understanding the idea that the image sensor can be looked at as an optical memory unit, where values can be analyzed as digital values of a memory unit. Using higher storage values and optical encoding manipulations, one can encode and extrapolate numbers of values to be decoded as different images.

One example for this method is presented below.

Method 3:

Projecting the set of optical paths through dedicated optical means, for example by diffraction. The set of optical paths in the formation of Fresnel and/or Kirchhoff and/or Frauenhoffer diffraction are convoluted and recorded on a camera image sensor and stored digitally.

1. The decoding and reconstruction is performed by numerical means based on the use of fast Fourier transform (FFT), and may also use spatial and/or temporal filtering as well polarization means.
2. Printing Images on Digital Sensor:
Simultaneously projecting said encoded images on digital sensor.
3. Input Image from Digital Sensor:
Input images from digital sensor may also be in a 12 bit RAW format, and may also be prior to a color interpolation processes (e.g. Demosaicing).
4. Decoding Complex Data, 4D Matrix Reconstruction.
4.1 A decoding complex multidimensional data set process may be done in order to extrapolate each of the subset of optical paths printed on the camera image sensor. Multiple data sets may be extrapolated directly from the complex multidimensional data set and/or from the extrapolated subset of optical paths. Following the decoding process may be the 4D matrix reconstruction.

In the case of spatial encoding, images might be reconstructed by reading the dedicated pixels from their printed coordinates on the CCD, thus reconstructing subsets of optical paths. Diffracted optical paths in the formation of Fresnel and/or Kirchhoff and/or Frauenhoffer diffraction that are convoluted and recorded on a camera image sensor and stored digitally.

The decoding and reconstruction may be performed by numerical means based on the use of fast Fourier transform (FFT), and may also use spatial and/or temporal filtering as well polarization means.

Complex multidimensional data sets based on color interpolation may be extrapolated by spatial and/or time decoding, by digital values interpolation as in the example of method 2, and in a 3D reconstruction process.

4.2 Reconstruct Multiple Images' Depth Maps in a 3D Matrix (XYZ)

Following the process of encoding the complex multidimensional data set, multiple data sets may be extrapolated directly from the complex multidimensional data set and/or from the extrapolated subset of optical paths (e.g. extrapolate depth maps of the input images), or to reconstruct a unified 3D image in a 4D matrix. In the following example the subset of optical paths of the complex multidimensional data set is the input for the 3D structure (depth reconstruction) placed in the 3D matrix. Depth extraction using image color information is best performed using the same color of the different images. Different colors might not extrapolate proper depth maps (even if we convert them to gray scale for example), because different color acquisition print different visual signatures on the image (such as a red table will leave low green or blue signatures if any).

Since in the following non limiting example, we are using a single CCD with a Bayer filter, the green holds half of the sensor original points, and since the depth map is done on the rows of the image to check the parallax disparity between the images, we need to enable a row of green for the first 11 camera (the left one), and on the same row, a row of green for the second image 12, to enable depth calculation.

Figure 11B:
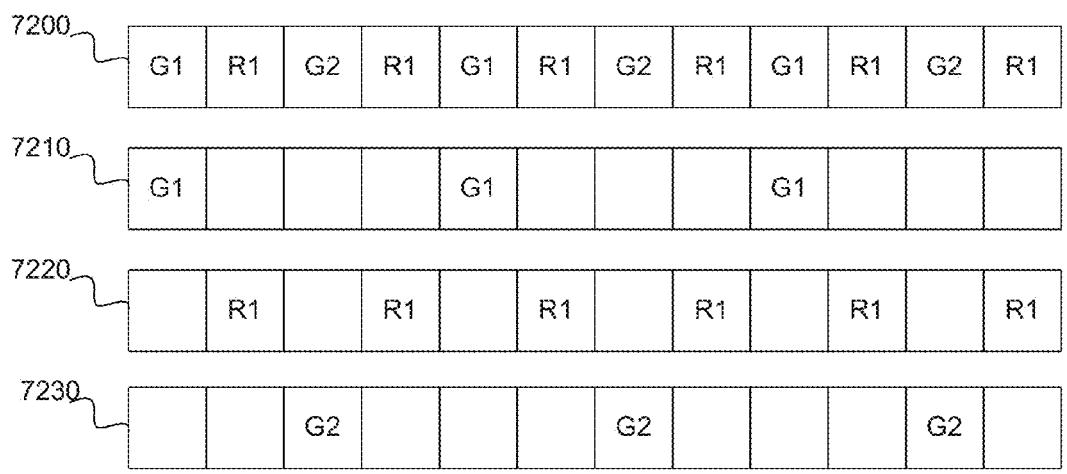
Figure 12:
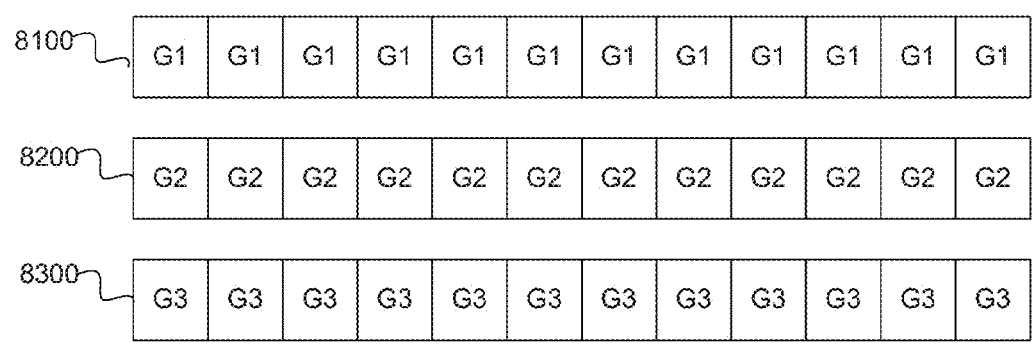
FIG. 12 includes illustrations of exemplary optical filters, in accordance with some embodiments of the present invention.

Turning now to FIG. 11B, there is shown the exemplary filter described hereinabove, the first encoded row/line is denoted by 7200. We may separate each element (G1/G2/R1) and receive the filters denoted by 7210, 7220 and 7230.

It should be clear to one of ordinary skill in the art that the Red resolution of image 1 was not damaged.

Figure 11C:
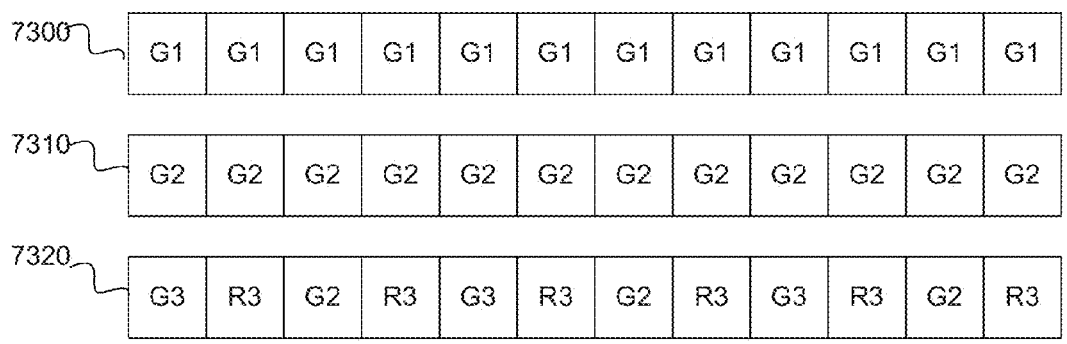

The outcome of reconstructing the vector color of each image for disparity purposes is shown in FIG. 11C, wherein line 1 is denoted by 7300, and line 2 is denoted by 7310.

We may use these rows to create a disparity map, depth map of the first row of images 1 & 2 using previously dedicated algorithms as previously discussed and as will further be explained by exemplary algorithms, and place the registered rows in a 3D matrix. The 3D rays' intersection of the original 3D projection frame (surface) are aligned.

Having positioned the points in 3D, we may now reconstruct the green vector color of row one & two using projected green from image 1, 2. And following the same process on lines 2 & 3, we may enable construction of a proper disparity map for images 2 & 3, as seen in 7330.

The positioned points in 3D, may enable us to reconstruct the green (or full RGB) as will further be explained to rows 1, 2, 3 images 1, 2, 3, as seen in FIG. 12.

4.2 Reconstruct 3D Color in the 3D Matrix.

The reconstruction of RGB for 3D point p' is performed in the following non limiting example: following the fact that we aligned in 3D the two images we now have for example the red color from image 1-line 1, as explained earlier, its resolution was not damaged, we also have the blue color of the same example point p' from image 2 line 2, blue color resolution was also not harmed, and since we also reconstructed the green in both rows, we can now interpolate and reconstruct the RGB for point p' based on the 3D location of neighboring pixels rather than on their original 2D position on the CCD in the first and second line.

The major difference of 3D color reconstruction in the 3D matrix with respect to the 2D RAW file Demosaicing, is the 3D positioning of each point in the 3D matrix, reconstructing the 3D structure of the projection frame in the real world.

Rays intersect in 3D, as opposed to their 2D location in the 2D image, each point in the 3D matrix resaves color from at least two different viewpoints. In our example, in line 1 point Pi receives red and green from image 1 and green from image 2, in the 2nd line receives green from image 1, green and blue from image 2, and so the ratio of 1/2 amount of green, 1/4 amount of Red and 1/4 amount of Blue is kept for each point, the 3D rays intersection allows for accurate positioning of 3D color, and the 3D Demosaicing may now take place, reconstructing a 3D color point in space, the Demosaicing is based on the 3D neighboring pixels from each image point of view up to a (neighboring) threshold, fully reconstructing the image lines, up to a full array of 12 bit (or more) per point of red, full array of 12 bit (or more) per point of blue, and same for green. Distortions on the reconstructed color will be 4D filtered over space and time.

4.3 Extrapolate Full RGB for Each of Input Images and Arbitrary Camera Positions As we now hold a XYZt', RGB-3D color for each point in the 4D matrix, we can generate 2D images also from arbitrary camera positions with depth information. An image is a 2D slice of the 4D light field.

The previous example was compression over space. Compression over time may also be generated using said encoding in the 4D matrix, adding the temporal vector to the XYZ spatial coordinates and RGB.

If the compression algorithm is used for compression of data transfer, the 4D matrix may be done only once, on the compressing side. Following the 4D matrix digital reconstruction, a new 2D complex function might be generated that encapsulates each pixels, RGB, XYZ, where the Z value might be encapsulated in the image data by, for example as previously mentioned in method 2, using higher bit values for each pixels (need only one extra value to RGB XY—the Z), enabling the immediate decoding of the 4D image on the receiving side with very low computational needs.

Following is a simple numerical example of the 3D reconstruction and compression algorithm, using image processing means (i.e. the input are two images). The image pixels are represented in their digital representation, thus establishing the accurate value in the compression process, and also in a printed version.

The input is 2×2D images. The algorithm comprises the steps of: (1) reconstruct a 3D matrix, (2) encode said matrix to a 2D complex function, enabling computation less decoding on the receiving end.

Turning now to FIG. 13A there is shown two exemplary input images for this example, the left image is denoted by 9100 and the right image is denoted by 9200. The first step is extracting a depth map. The input images are full array of RGB each, accordingly a depth map can be reconstructed as previously explained on all image layers:

The end process is the positioning of pixels in a 3D space, intersecting rays from both images.

Turning now to FIG. 13B there is shown a region positioned on the same depth, of the Mobile phone that is located on the right of the white cap of coffee, the left image is denoted by 9300 and the right image is denoted by 9400

A vector of pixels on the same depth of one color from two images would look like this:

| R | 42 | 42 | 33 | 21 | 13 | 14 | 28 | 58 | 97 | 144 | 176 |
|---|----|----|----|----|----|----|----|----|----|-----|-----|
| L | 45 | 42 | 36 | 30 | 18 | 17 | 26 | 51 | 95 | 138 | 179 |

Having positioned every pixel in the image in a 3D space we can unify its color by interpolating the intersected rays, encapsulating them in to a single pixel. The interpolated image may be the following example (3× Matrix layers for Red Green and Blue).

$$M2(:,:,1) = \begin{matrix}
0 & 1 & 0 & 0 & 0 & 0 & 0 & 0 & 0 & 0 & 0 & 0 & 1 \\
0 & 43 & 42 & 34 & 25 & 15 & 15 & 27 & 54 & 96 & 141 & 177 & 0 \\
0 & 38 & 34 & 25 & 18 & 12 & 16 & 38 & 71 & 117 & 165 & 204 & 0 \\
0 & 32 & 23 & 14 & 9 & 14 & 30 & 59 & 100 & 146 & 192 & 277 & 0 \\
0 & 28 & 15 & 5 & 7 & 19 & 43 & 84 & 133 & 176 & 217 & 240 & 0 \\
0 & 23 & 11 & 7 & 11 & 29 & 61 & 114 & 167 & 205 & 230 & 250 & 1 \\
0 & 18 & 11 & 11 & 25 & 51 & 89 & 146 & 196 & 226 & 244 & 249 & 0 \\
0 & 16 & 11 & 20 & 47 & 84 & 130 & 182 & 222 & 244 & 251 & 247 & 1 \\
0 & 16 & 20 & 38 & 72 & 118 & 164 & 211 & 238 & 249 & 251 & 242 & 0 \\
0 & 19 & 35 & 63 & 101 & 147 & 191 & 225 & 245 & 250 & 242 & 227 & 0 \\
1 & 30 & 57 & 92 & 130 & 173 & 212 & 235 & 243 & 241 & 226 & 209 & 0 \\
0 & 47 & 84 & 125 & 162 & 196 & 222 & 232 & 234 & 224 & 207 & 188 & 0 \\
0 & 65 & 107 & 149 & 183 & 210 & 225 & 229 & 222 & 210 & 190 & 171 & 0 \\
1 & 83 & 122 & 160 & 190 & 211 & 224 & 221 & 210 & 198 & 178 & 161 & 0 \\
1 & 101 & 139 & 171 & 196 & 209 & 212 & 206 & 194 & 182 & 171 & 155 & 2 \\
0 & 0 & 0 & 0 & 0 & 0 & 0 & 0 & 0 & 0 & 0 & 0 & 0
\end{matrix}$$

$$M2(:,:,2) = \begin{matrix}
0 & 0 & 0 & 0 & 0 & 0 & 0 & 0 & 0 & 0 & 0 & 0 & 0 \\
0 & 44 & 45 & 37 & 27 & 18 & 18 & 31 & 59 & 103 & 149 & 183 & 1 \\
0 & 39 & 36 & 28 & 20 & 17 & 21 & 44 & 77 & 124 & 172 & 211 & 0 \\
0 & 33 & 24 & 15 & 13 & 18 & 34 & 65 & 107 & 154 & 198 & 235 & 0 \\
0 & 28 & 16 & 9 & 10 & 24 & 49 & 92 & 140 & 184 & 223 & 248 & 0 \\
0 & 23 & 14 & 9 & 14 & 32 & 66 & 118 & 171 & 211 & 237 & 253 & 0 \\
0 & 19 & 13 & 13 & 28 & 52 & 91 & 148 & 201 & 231 & 250 & 252 & 0 \\
0 & 16 & 13 & 23 & 50 & 86 & 131 & 184 & 226 & 246 & 254 & 250 & 0 \\
1 & 18 & 22 & 40 & 74 & 120 & 167 & 213 & 241 & 252 & 254 & 244 & 0 \\
0 & 22 & 37 & 64 & 102 & 149 & 193 & 224 & 245 & 250 & 243 & 227 & 0 \\
0 & 31 & 59 & 93 & 132 & 175 & 213 & 234 & 244 & 242 & 227 & 210 & 0 \\
0 & 48 & 85 & 127 & 164 & 198 & 224 & 232 & 234 & 223 & 207 & 189 & 0 \\
0 & 66 & 108 & 151 & 184 & 212 & 227 & 230 & 224 & 209 & 188 & 173 & 0 \\
0 & 84 & 124 & 162 & 193 & 213 & 226 & 219 & 210 & 195 & 176 & 162 & 0 \\
0 & 102 & 141 & 172 & 197 & 210 & 214 & 205 & 193 & 179 & 166 & 154 & 0 \\
0 & 1 & 0 & 0 & 0 & 0 & 0 & 0 & 0 & 0 & 0 & 1 & 0
\end{matrix}$$

$$M2(:,:,3) = \begin{matrix}
0 & 1 & 0 & 1 & 1 & 0 & 0 & 0 & 0 & 0 & 0 & 0 & 0 \\
0 & 45 & 44 & 38 & 30 & 19 & 20 & 32 & 61 & 104 & 150 & 184 & 4 \\
0 & 40 & 36 & 30 & 23 & 19 & 23 & 45 & 77 & 125 & 174 & 212 & 2 \\
0 & 35 & 26 & 18 & 15 & 20 & 37 & 65 & 108 & 156 & 201 & 236 & 1 \\
0 & 31 & 18 & 12 & 12 & 26 & 51 & 91 & 140 & 186 & 226 & 248 & 0 \\
0 & 26 & 17 & 13 & 17 & 36 & 69 & 120 & 172 & 213 & 239 & 253 & 0 \\
0 & 21 & 16 & 15 & 30 & 55 & 94 & 149 & 203 & 233 & 251 & 253 & 1 \\
0 & 19 & 15 & 24 & 50 & 86 & 133 & 182 & 222 & 241 & 248 & 244 & 0 \\
1 & 19 & 23 & 40 & 74 & 120 & 166 & 209 & 235 & 246 & 244 & 237 & 0 \\
1 & 23 & 38 & 67 & 104 & 149 & 193 & 220 & 240 & 241 & 232 & 218 & 2 \\
1 & 33 & 59 & 94 & 132 & 175 & 212 & 229 & 237 & 231 & 216 & 199 & 2 \\
0 & 48 & 84 & 126 & 161 & 194 & 220 & 224 & 226 & 216 & 197 & 179 & 0 \\
2 & 68 & 108 & 150 & 182 & 209 & 223 & 223 & 214 & 201 & 179 & 161 & 0 \\
0 & 83 & 121 & 158 & 187 & 206 & 220 & 211 & 202 & 184 & 167 & 149 & 0 \\
0 & 100 & 136 & 169 & 191 & 206 & 211 & 199 & 185 & 167 & 157 & 142 & 0 \\
1 & 0 & 0 & 0 & 0 & 0 & 1 & 0 & 0 & 0 & 0 & 0 & 4
\end{matrix}$$

The graphical outcome of the above explained manipulations is depicted in FIG. 13C.

Printing the image pixels as a single image, we would also want to add their Z value so that the receiving end of the data will not need computation. Using mathematical manipulations similar to the second previously mentioned method, the outcome 2D complex function would be XYZ RGB, for every pixel in the image.

5. Output 5.1 Output from the 4D Matrix

Fast generation of different data and views, is generated by rendering a 2D array of image data, wherein the 2D slice of the 4D matrix represents rays through a point, properly resampled to avoid artifacts in the final image data.

5.1.1 Holographic Stereogram (still & Video):

5.1.2 Extrapolate multiple discrete dedicated viewpoints to Holographic Stereogram display device.

5.1.3 Using digital holography (e.g. Fourier transform and Fresnel diffraction as previously discussed) digitally project said 4D matrix as a 2D image for digital holography future reconstruction.

5.1.4 Depth map: extrapolate Z channels of the 4D matrix.

5.1.5 Depth Perception: extrapolate stereo discrete viewpoints to stereoscopy display device.

5.1.6 2D images (from multiple viewpoints): extrapolate a discrete viewpoint to suitable display device.

5.2 Output Following the Decoding Process of the Complex Multidimensional Data Set without 4D Matrix Reconstruction The optically encoded complex multidimensional data set holds the 3D attributes of the photographed projection frame (as previously explained).

5.2.1 One can access these attributes and extrapolate the information directly from the 2D complex function.

5.2.2 The encoding process may also enable the extrapolation, for example, of the multiple 2D images of the projection frame.

5.2.3 Once the multiple 2D images of the projection frame are decoded, the images may be viewed directly as 2D images of the projection frame.

5.2.4 Depth information of desired 2D points, image parts, and full depth maps using passive methods may be extrapolated as will further be explained from the multiple images of the projection frame.

5.2.5 One can also output the multiple images for holographic stereogram and stereoscopic display.

5.2.5.1. Using images from each slit for viewing, a viewer looking at the stereogram will see two different projection views through two slit apertures, one through each eye. The brain interprets the differences between the two views as three-dimensional information. If the viewer moves side to side, different pairs of images are presented, and so the scene appears to gradually and accurately change from one viewpoint to the next to faithfully mimic the appearance of an actual three-dimensional scene.

5.3 Stereographic and Stereoscopic Display Algorithm

Processing algorithm for creating holographic-stereogram and stereoscopic images from said collection of images may also be the following process, wherein said holographic-stereogram and stereoscopic image pair covers said holo-stereo lens Scene—POV (point of view).

The image captured by each mini-lens/slit is processed separately.

Distorted information may be removed from each image of each lens separately. The images may then be cropped into pre-defined sections which are required for keeping an adequate overlap between adjacent images.

For stereogram and stereoscopic display, a stereoscopic image pair may be created from the group of selected images in the following non limiting examples:

Each of the selected lens images may be divided into a left part and a right part using a line passing through the center of the image. All the left parts may be merged into one uniform two dimensional image for the right image of the stereoscopic pair to be displayed to the viewer's right eye. Following the same concept, a left image may be formed by merging together the right parts generated from the images.

A stereoscopic image pair can also be created from the group of selected images in the following non limiting example:

Each of the slits/mini-lens being on the left side of two adjusted images is divided into a left lens. Each of the slits/mini-lens being on the right side of two adjusted images is divided into a right lens. All the left lenses are merged into a one uniform two dimensional image for the left image of the stereoscopic pair to be displayed to the viewer's left eye. Following the same concept, a right image is formed by merging together the right lenses.

The new images Left and Right both cover the viewer's field of vision but obviously they are not identical, and are perceived as were taken from two different viewpoints, thus giving the viewer a stereoscopic perception.

Roughly speaking, this new image pair is equivalent to a pair of images taken by two virtual lenses having their optical axes directed forward in the viewer's viewing direction and having horizontal disparity.

The same holds using any of the Holo-Stereogram optical configurations wherein the field of vision of each lens overlaps to a great extent the fields of view of all adjacent lenses and the lenses are optionally equally distributed on the lens's surface.

Using the configuration where multiple mini lenses are distributed on the Holo-Stereogram lens surface, stereoscopic image pairs can also be created when the viewer's horizon is inclined with respect to ground (i.e., when the viewer eyes are not at the same height with respect to ground). For such cases, the selection of horizon of the images is done by projecting the viewer's horizon on the collection of the lenses and the stereoscopic pair is generated by following the same steps.

Displaying

The data and images may be displayed to a viewer in various formats, such as stills or video.

The images formed can be displayed by any of the dedicated means such as dedicated hologram display device, stereoscopic viewing, virtual reality, and so on. Depth maps can be viewed in a display device suitable for 3D viewing, can be exported to any 3D image or graphic image processing software to be used for editing and interpolation of any kind using the 3D extracted information.

Image Processing Manipulations of the Images

The process of image processing manipulations of the images may be comprised of endless possible options for image manipulations in real time based on the 3D information of the images.

The 3D images are a virtual world. Said virtual world is created in a designated area, where every point in the camera's POV is a 3D point in the virtual world. In the said virtual world 2D or 3D real images and computer generated images from different sources may be merged.

The 3D position of every point in this virtual world is known. We can synchronize between virtual world and other photographed images or computer generated images using space and time synchronization, fitting real world images and computer generated images in the virtual world in spatial and temporal terms.

For those skilled in the art, said virtual worlds can be referred to as virtual studios for example, using the 3D information from the virtual world. Manipulations such as separation between a figure and its background, based on the distance of the figure from the camera are possible. Isolating a figure from its surrounding we can interlace the figure in the virtual world created in a computer.

The opposite can also be done interlacing a CGI figure or photographed image from different sources into the 3D image.

Holographic stereogram and stereoscopic information enables enhancement of the 3D sensation to the viewers interpolating not only on the 3D positioning in the image, but also in the 3D sensation using stereoscopic imagery, The present invention is not limited with regards to the type of camera(s) used for capturing the images or sequences of images. The camera(s) may be selected from any known in the art digital or analog video/still cameras, and film cameras. If needed, non-digital data may be converted to digital using known in art techniques.

According to some embodiments of the present invention, a holographic stereogram can also be cylindrical or spherical for panoramic or spherical view. This is achieved by producing stereograms with a cylinder or a spherical plane.

Depth Map Reconstruction

The depth map reconstruction process computes the depth map of a projection plane captured by the holographic stereogram capturing device images, from multiple view points, reconstructing the 3D formation of the projection frame as a 4D matrix. The collective field of vision captured by all said images covers the whole projection frame of said array of images, and wherein any point in said projection frame is captured by at least two of said images.

The first part of the algorithm may be considered in the case where input images from the digital sensor are full RGB images. The printing (e.g. encoding) methods on the digital sensor and reading of said images (e.g. decoding) as full RGB images were described earlier.

Depth Map Reconstruction Method

The following example will demonstrate a basic depth map reconstruction method. It should be understood by those skilled in the art that the 4D Matrix algorithms are not limited to any such specific method. Traditional depth map reconstruction methods match points and vectors in the spatial domain to determine correspondence between pixels in multiple images in a single static moment in time. Corresponding features are identified, and rays are intersected to find the 3D position of each feature.

Adding the time domain, using multiple frames across time, we may match a single pixel from the first image against the second image. Rather than increasing a vector by considering a neighborhood in the spatial direction, it is possible to increase a vector in the temporal direction. Space-time depth map reconstruction adds a temporal dimension to the neighborhoods used in the matching function. The computation matches based on oriented space-time windows that allow the matching pixels to shift linearly over time. The match scores based on space-time windows are easily incorporated into existing depth map reconstruction algorithms. The matching vector can be constructed from an arbitrary spatiotemporal region around the pixel in question. In the case of rectangular regions, a window of size N×M×T can be chosen, Where N and M are the spatial sizes of the window, and T is the dimension along the time axis. The optimal space-time matching window depends on the speeds with which objects in the scene move. Static scenes—a long temporal window will give optimal results. Scenes with quickly moving objects—a short temporal window is desirable to avoid the distortions when objects move at intermediate speed, it is likely that a space-time matching window with extend in both space and time will be optimal. A correspondence must exist between the holographic stereogram exposure geometry and the 4D Matrix reconstruction.

The following example is a Pseudo Code for depth map reconstruction:

Variable Definitions:
f=is the focal length.
B=is the distance between the cameras.
$X_1$, $X_2$=the location of point P in Image 1 and in Image 2.
Assumptions:
Since the difference between Z1 and Z2 (which are the Z value of point 1 and point 2) depends only on the differences of the X values, we can generate Z which is not absolute, but is relative to one of the points in the image.
Pseudo Code (for Input of 2 Images):

Take some point p and find its x1 and x2, as an example, one can use SSD (sum of square difference).
Denote the expression (x1− x2) for point p: "deltaX[p]"
Z of point p (Zp) will be: f*B/deltaX[p]
take another point p+1, compute "deltaX[p+1]"
Z of p+1 (Z[p+1]) will be: f*B/deltaX[p+1]
K=deltaX[p+1]/deltaX[p]
So Z[p+1]=f*B/deltaX[p+1]=(f*B)/(K*deltaX[p])=Z[p]/K
Using this scheme Z[p+n] every point p+n (while n=1: . . . ) we can write using Z[p] And some known number K (K can differ)
Then find n=m such that K for his point (P+m) will be the largest And so Z[p+m] will be the smallest.
Define Z[p+m]=1, and find Z[p] from here.
Then find the values of all Z[p+n] where n=1.
Input of Multiple Images:
X1(w)=(fx)/z and Xk(w)=f(X−b1k)/z
Where K=2, . . . , N
b1k=O1k--in the baseline corresponding to the Kth view point
f--Focal distance
with respect to first (leftmost) image I1
each point W is viewed in the other images with respective disparities
dk(w)={Xk(w) X1(w) if W is visible in Ik [0244] {undefined if W is not visible in Ik (is occluded))
where K=2, . . . , N
If W is visible in Ik so:
dk(w)=−f(b1k)/z
the end disparity of W point--d (w) will be
d(w) = (Σk=2N dk(w))1/(N−1)

The output of such an algorithm is a depth map, located in a 4D matrix, corresponds to the multiple images of the holographic stereogram, along the time axis.

3D Color Reconstruction

The next step will be the 3D color reconstruction. The following exemplary 3D Color reconstruction method may be used in the case where the input multiple images are full RGB each, where each point in the scene is viewed from number of viewpoints, a finite number of different views of the scene. The outcome display of the holo-stereography may be continuous 3D color information of an object's appearance, approximated by a finite number of two-dimensional images of that object. The 3D color reconstruction is the horizontal approximation of the continuous natural color captured optically in a discrete form. The output images from the 4D matrix are images of natural scenes with natural lighting.

The reconstructed image in the 4D Matrix hold full RGB color for every point in the image from every point of view. Pending on the dedicated output, one way of output would be to leave the color as layers of full color from every exposed point of view, outputting the image from a discrete point of view with its original color. The other way would be to re-interpolate each point into unified color information of multiple viewpoints. This is especially important in digital sensors such as CCD and Bayer filters where the 3/4 of the red and blue, and half of the green color in every point in the image are reconstructed from surrounding points and thus re-demosaicing can enhance dramatically the image quality. Known in the art methods exist to interpolate color for every point. In the 4D matrix, re-interpolation will overcome image distortions, enhance image quality and enable higher resolution. A general example is given here. It should be understood by those skilled in the art that the 3D color reconstruction algorithm is not limited to any such specific method.

The camera's horizontal position determines the angle at which the camera's rays strike the plane of the hologram. Viewing the input images in 2D, similar points in the projection frame appear to be located in the image in deferent horizontal positions, due to the disparity of the images exposed to the projection frame. So color reconstruction cannot be done on points that are located on the similar (X,Y) 2D coordinates in the different images. Following the process of the 4D matrix, the projection frame may be reconstructed in a 3D matrix and similar points may be identified in the different images and in the 3D matrix, each point from every image may be located in identical point locations seen from said images.

As a point's color in the real world is a color we can define as our absolute color, the one we will strive to reconstruct in the 3D matrix, different angles exposed to the same point will preserve this color with given distortions such as angles, different horizontal positioning in the image, different lighting, optical distortions and so on. But, given the fact that all projection of the same point, are a percentage of the absolute color of that point's color in reality, there is no point in preserving each point's color from different angles but rather to interpolate the point's color from the different angles target to reconstruct as best as can be the original absolute color of each point.

Furthermore, demosaicing based on 3D location of points in space, interpolate color of points based on surrounding points in the same depth, prevents many distortions that interpolation in 2D images suffer from, for example we interpolate the edge of a wooden table pixel with the pixels of the wall behind him, as opposed to interpolate the wood only with points that surround him in 3D, giving higher image quality to every point in the image and enhancing resolution.

A demosaicing algorithm is used to interpolate a set of RGB color for every point in the image also enabling the enhancement of resolution (adding more interpolation points then in the original images), using the point's color as projected from the different viewing angles, and the neighbors 3D surrounding each point, reconstructing a final image which contains full color information (RGB) at each pixel. This process may be done using existing methods to obtain better interpolation.

The demosaicing algorithm works as a RAW format in the sense that it contains pixel information far greater than the final outcome, targeted to reconstruct the absolute color on the one hand while preserving the color characteristics from every angle on the other, in exporting the data or reconstructing new viewpoints that where not exposed originally.

The computer generated 4D matrix of the holographic stereogram is the reconstructed outcome of the incoherent light digital holography apparatus (i.e. this invention). Computer generated holography (CGH) may also be digitally printed using known in the art computer generated Fresnel and/or Kirchhoff and/or Frauenhoffer diffraction by simulating computer generated coherent light.

In this invention, the process of capturing, optically encoding the complex multidimensional data set, decoding and reconstruction of the 4D matrix process under incoherent illumination and digital computing, may be the equal process of coherent light digital holography and/or stereographic hologram process.

According to another embodiment of the present invention, The optical encoding process that creates the complex multidimensional data set equals the complex phase and amplitude digital printing and reconstruction under coherent light. In this embodiment, convolved diffracted light (from the object) propagates through a particular optical system, thus succeeds in recording the complex amplitude of some wave front without beam interference. The claim is that complex amplitude can be restored under incoherent conditions. Once this complex function is in computer memory, one can encode it to a CGH (computer-generated hologram).

This CGH may then be illuminated by a plane wave, which then propagates through the proper optical system. The reconstructed image has features similar to those of an image coming from a coherently recorded hologram.

Figure 15A:
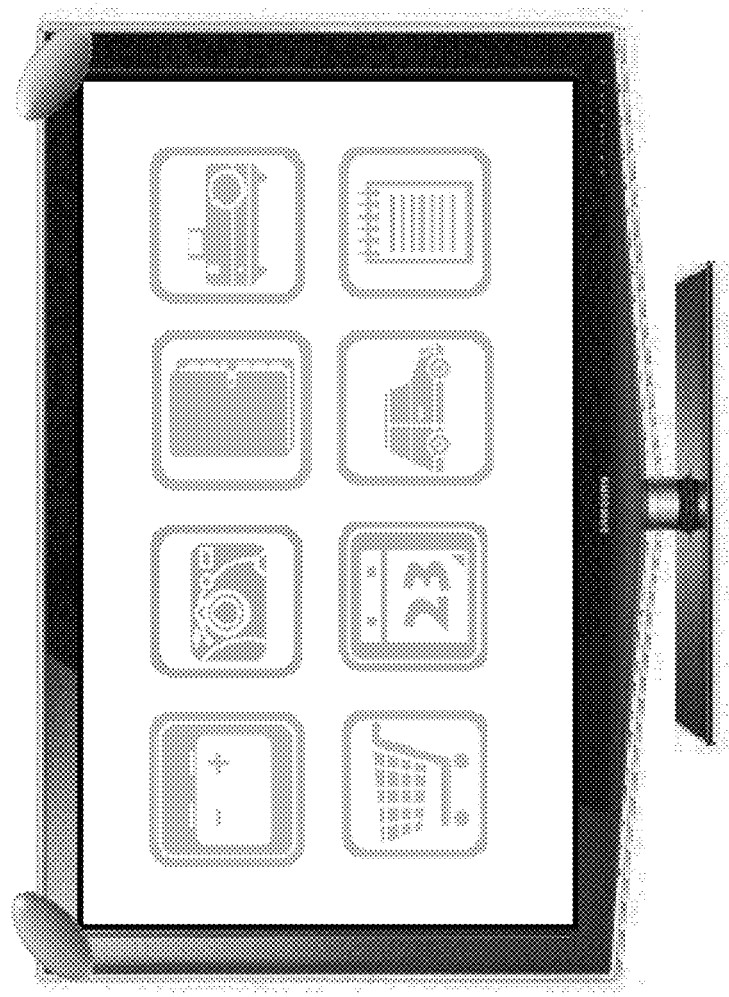
Figure 15A:
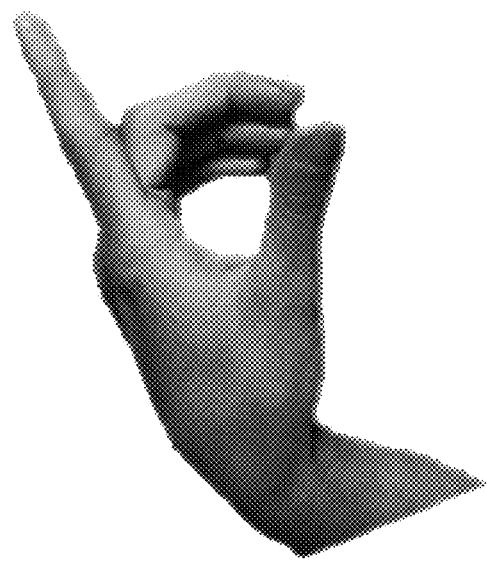

According to further embodiments, a controller of a display functionally associated with the active space may be adapted to alter the size, shape, appearance and/or location of elements within the display and/or alter the content and/or characteristics of the display based on the determined position, orientation and/or movement of control objects within the active space [demonstrated in FIGS. 15A-15E, wherein FIG. 15A illustrates the display prior to alteration and FIGS. 15B-15E demonstrate different possible alterations of the display]. For example, a given icon upon an interactive display may be enlarged when it is determined that a finger of a user is approaching the given icon or the entire display may brighten when a finger approaches it.

Figure 15B:
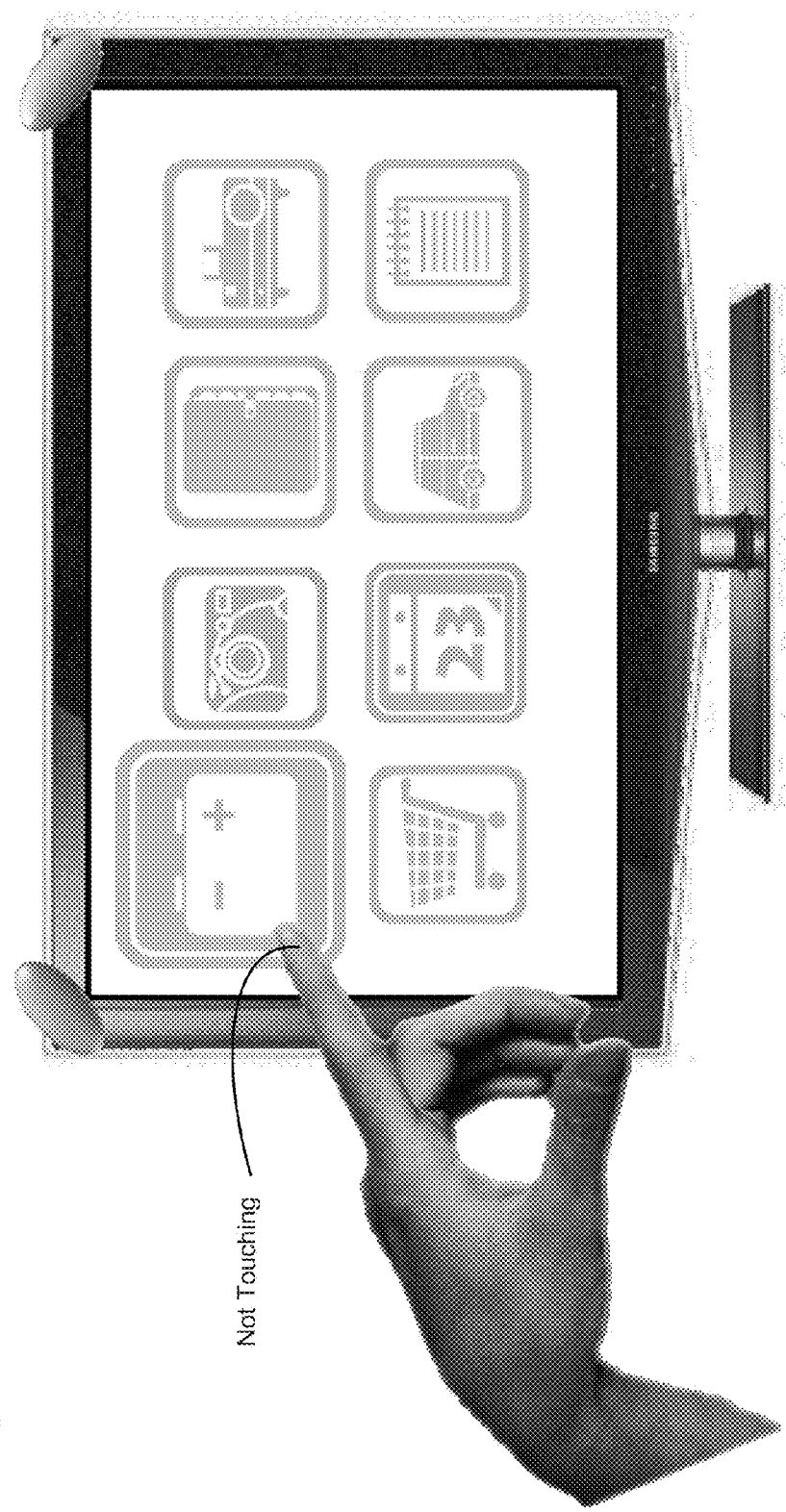
Figure 15C:
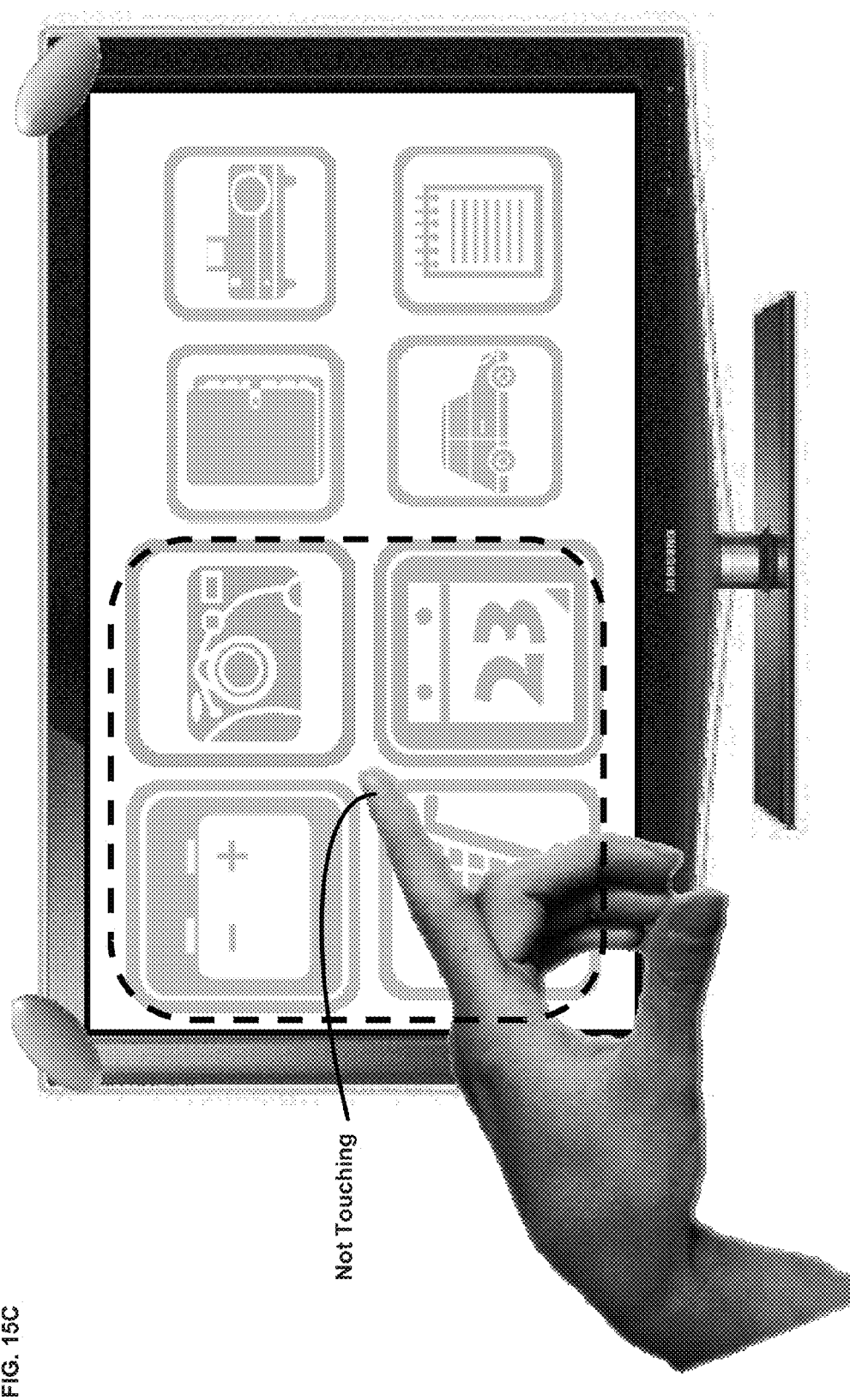
Figure 15D:
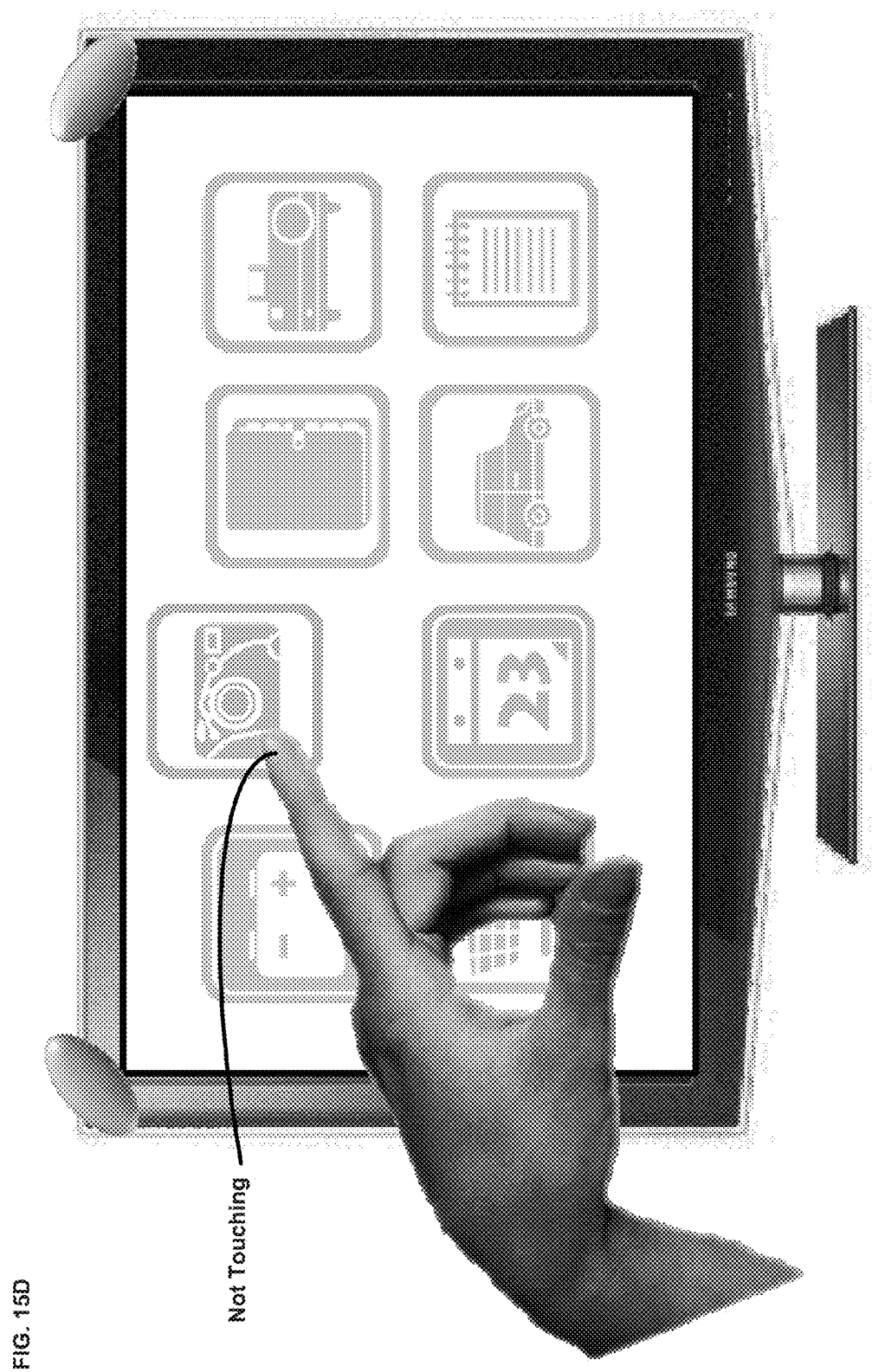

According to some further embodiments, there may be provided a graphic interface apparatus and/or module for an electronic device including an adaptive input arrangement adapted to alter a size, shape, appearance and/or location of elements within the display and/or alter the content and/or characteristics of the display based on a signal or an indication from a sensor or other element (e.g. embodiments described above) regarding a position or motion vector of a control object, such as a finger, limb or implement. The adaptive input arrangement may include a display functionally associated with a graphics processing circuit, which processing unit may be adapted to render one or more input elements and to project or otherwise display the one or more elements on the display. The apparatus may include, or be functionally associated with, a sensor or similar element (e.g. embodiments described above) adapted to sense a position or motion vector of a control object, such as a finger, limb or implement, in proximity with said display. A signal derived from an output of the sensor or similar element may be provided to the graphics processing circuit and may cause the graphics processing circuit to modify/alter the display by:

(1) altering a feature/characteristic of one or more projected interface elements—for example the size of an input element (e.g. a keyboard key projected on the display and its associated touch-screen sensor area) in proximity with a position of a user element, such as a finger, limb or implement may be enlarged [demonstrated by FIG. 15B as modified from FIG. 15A] or an area in proximity with a position of a control object may be magnified [demonstrated by FIG. 15C as modified from FIG. 15A];

(2) modify the location of one or more interface elements—for example, an input element closest to an approaching control element may move towards the control element ("magnetic" icons) [demonstrated by FIG. 15D as modified from FIG. 15A];

(3) altering a feature of the entire/portion of the display—for example, upon a control element approaching the display the display may brighten:

(4) alter the content and/or arrangement of the display—for example, upon a control object approaching a given element of the display, menu options relating to the given element may be displayed/opened upon the display [demonstrated by FIG. 15E as modified from FIG. 15A]. For example, upon a user finger approaching a "games" icon upon the display, a menu of game applications may open in place of the "games" icon, such that the user may immediately select chess without first touching the "games" icon. This feature may also be referred to as intuitive/predictive menus/display; and (5) add information or relevant graphic elements to the display—for example, upon a control object approaching an element of the display, "help" tips may appear aside the element or related operational information (e.g. last opened on _____ ).

The sensor may be selected from a group of sensors consisting of (1) proximity sensors, (2) image sensors, (3) image sensor arrays, (4) electrostatic sensors, (5) capacitive sensors and/or (6) any other suitable sensor. The interface apparatus may be part of a computing device, communication device or any other electronic device known today or to be developed in the future.

Figure 1B:
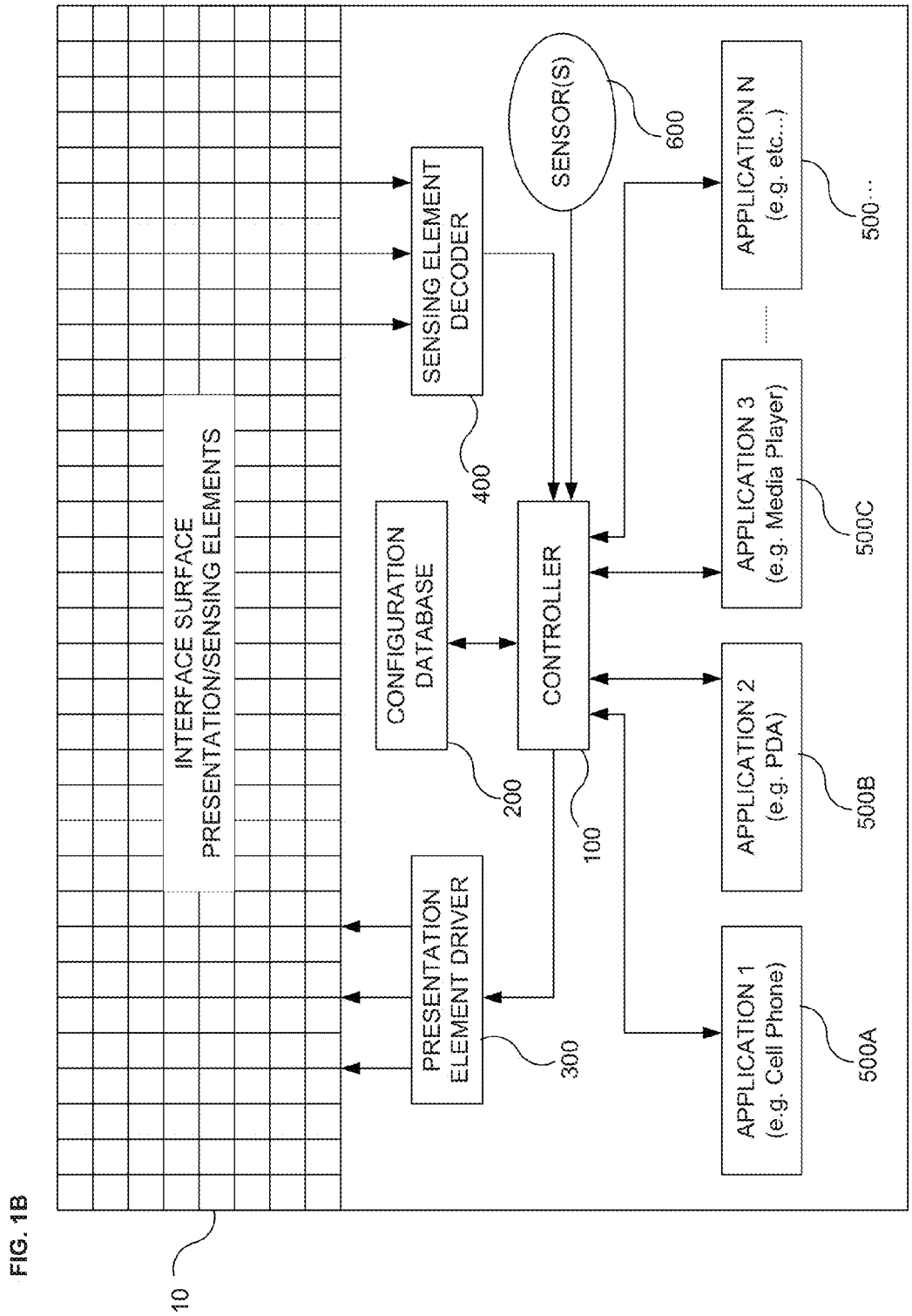

Turning now to FIG. 1, there is shown a block diagram of an exemplary mobile device according to some embodiments of the present invention, including an interface surface and various electrical functional blocks to drive and interact with the interface surface or touch-screen assembly. The exemplary device may include a controller 100 adapted to regulate signals to a presentation element driver 300, which presentation element driver 300 may be functionally associated with presentation elements (e.g. Light Emitting Diodes, LCD, etc..) of an interface surface 10. The controller may also be adapted to receive signals from a touch sensing element decoder 400, which decoder 400 is functionally associated with touch sensing elements (e.g. touch sensors, etc.) of the interface surface. Alternatively, the controller may receive signals from any other element adapted to determine control object motion and position in relation to the interface surface 10 (e.g. image sensor array embodiments described above). The controller may also be adapted to receive control object location, orientation and/or motion indications or information from a touchless sensor 600 (e.g. image sensor array embodiments described above).

It should be understood that the controller 100 may be a processor, a graphics processor, dedicated control logic or any combination thereof.

A configuration database 200 may include information used by the controller 100 in regulating signal flow to the presentation element driver. As shown in FIG. 1, the configuration database 200 may include such information as interface element (e.g. buttons or display area) shape and location, display properties, etc., for each of the applications 500A through 500N installed on the device. It should be understood by one of ordinary skill in the art that interface elements such as buttons and displays mentioned above are not physical buttons or displays, but rather virtual elements projected through the presentation surface 10. For each given application 500A through 500N, the configuration database 200 may also include sensing element mapping information corresponding to presentation information/elements associated with given application to specific functions. The controller 100 may use the mapping information to determine which interface element is interacted with (when the screen is touched or approached) by the user and which function/command that interaction is meant to trigger.

The controller may be adapted to alter a size, shape, appearance and/or location of elements within the display and/or alter the content and/or characteristics of the display based on a signal or indication provided by the touchless sensor 600 regarding a control object, such as a finger/limb/implement, location, orientation and/or motion relative to the sensing surface or any of the elements projected onto the sensing surface. The controller may make a given input element towards which the finger/limb/implement is approaching more prominent and/or present further input elements associated with the given input element. The controller may also adjust its touch-sensor element to function mapping to correlate with the adjusted projected/displayed input element size, shape or location.

According to some embodiments of the present invention, the touchless sensor 600 may be adapted to determine the position and/or motion of a user element, such as a finger/limb/implement, relative to the touch-screen or relative to elements projected/rendered/displayed thereon. The touchless sensor may be part of an image based human machine interface (as described above). The image based human machine interface may include one or more image sensors and software running on the controller, on another generable purpose processor or on a dedicated processor. It should be understood by one of skill in the art that any functionally correlated (i.e. can serve the same function) touchless sensor may be used as part of some embodiments of the present invention. In other words, although this disclosure primarily describes image based sensors monitoring an active space, it should be understood that any type of sensor adapted to monitor positions and orientations of a control element within an active space may be equally implemented, in accordance with some embodiments of the present invention. Equally, configurations of optical elements (sensors, reflectors, lenses and/or other optical elements), other than those described above, may be implemented to achieve optical monitoring of position, orientation and/or movement of control objects within an active space. For example, image sensors, reflectors and/or any other type of sensor (e.g. proximity sensors) may be positioned within an associated computational device, interface surface and/or display, adjacent to an associated computational device, interface surface and/or display and/or within sight of an associated computational device, interface surface and/or display It should be understood that any sensor type and configuration adapted to monitor position, orientation and/or movement of control objects within an active space may be implemented according to the principles presented herein.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

I claim:

1. A human machine interface system comprising:
   one or more image sensor arrays;
   multiple optical paths directing light from an active space to said one or more image sensor arrays;
   rendering circuitry adapted to render and display upon a first surface a graphic user interface comprised of rendered control elements;
   user interface circuitry adapted to generate and transmit a user input signal to an associated computational platform, upon a control object contacting any of said control elements;
   image processing circuitry functionally associated with said image sensor arrays and adapted to:
   (1) receive image data generated by said image sensor arrays,
   (2) recognize features of a given control object appearing in the image data and
   (3) determine positions of the given control object within the active space based on image data collected by said one or more image sensor arrays via said multiple optical paths; and
   graphic interface control circuitry including interfacing logic configured to modify the appearance of the control elements, based on signals received from said image processing circuitry indicating the positions of the given control object within the active space, while the given control object is not contacting the first surface, determined by said image processing circuitry based on image information collected by said one or more image sensor arrays via said multiple optical paths;
   wherein the active space is a spatial region directly adjacent, contiguous and substantially parallel to said first surface.

2. The human machine interface according to claim 1, wherein said image processing circuitry is further adapted to determine orientation of objects within the active space, based on image information collected by said one or more image sensor arrays via said multiple optical paths.

3. The human machine interface according to claim 1, wherein said image processing circuitry is further adapted to determine movement of objects within the active space based on a series of images received from said image sensors.

4. The human machine interface according to claim 1, wherein said image processing circuitry is further adapted to perform background removal upon the image data.

5. The human machine interface according to claim 1, wherein said first surface is a touchscreen.

6. The human machine interface according to claim 5, wherein said multiple optical paths are achieved by reflectors positioned at boundaries of the touchscreen.

7. The human machine interface according to claim 1, wherein said one or more image sensor arrays comprises a sole planer image sensor.

8. The human machine interface according to claim 1, wherein said computing platform is a mobile device.

9. The human machine interface according to claim 8, wherein said mobile device is a cellular phone.

10. The human machine interface according to claim 9, wherein said multiple optical paths are achieved by reflectors positioned at the boundary of a screen of said cellular phone.

11. The human machine interface according to claim 8, wherein said mobile device is a laptop computer.

12. The human machine interface according to claim 11, wherein said multiple optical paths are achieved by reflectors positioned at the boundary of a screen of said laptop computer.

13. A method for human machine interfacing, said method comprising:
   positioning one or more image sensor arrays to capture image data of an active space via multiple optical paths;
   determining, by processing circuitry, positions of objects within the active space, using image information collected by said one or more image sensor arrays via said multiple optical paths;
   rendering and displaying upon a first surface a graphic user interface comprised of rendered control elements;
   generating and transmitting a user input signal to an associated computational platform, upon a control object contacting any of said control elements;
   receiving image data generated by said image sensor arrays by image processing circuitry functionally associated with said image sensor arrays;
   recognizing, by the image processing circuitry, features of control objects appearing in the image data;
   determining positions of control objects within the active space based on image data collected by said one or more image sensor arrays via said multiple optical paths;
   modifying, by graphic interface control pressing circuitry, the appearance of the control elements, based on signals received from said image processing circuitry indicating positions of objects within the active space determined based on image information collected by said one or more image sensor arrays via said multiple optical paths; and
   wherein the active space is a spatial region directly adjacent, contiguous and substantially parallel to said first surface.

14. The method according to claim 13, further comprising determining orientation of objects within the active space, based on image information collected by said one or more image sensor arrays via said multiple optical paths.

15. The method according to claim 13, further comprising determining movement of objects within the active space based on the determined positions of objects in a series of images.

16. The method according to claim 13, wherein said first surface is a touchscreen.

17. The method according to claim 16, wherein positioning one or more image sensor arrays to capture image data of an active space via multiple optical paths comprises positioning reflectors at boundaries of the touchscreen.

18. The method according to claim 13, wherein said one or more image sensor arrays comprises a sole planer image sensor.

19. A human machine interface system comprising:
   one or more image sensor arrays;
   multiple optical paths directing light from an active space to said one or more image sensor arrays, each optical path including an identifying optical element designed to identify image data travelling through the optical path and distinct from identifying optical elements of other optical paths;

rendering circuitry adapted to render and display upon a first surface a graphic user interface comprised of rendered control elements;

user interface circuitry adapted to generate and transmit a user input signal to an associated computational platform, upon a control object contacting any of said control elements;

image processing circuitry functionally associated with said image sensor arrays and adapted to:

(1) receive image data generated by said image sensor arrays, (2) determine positions of the control objects within the active space based on the image data collected by said one or more image sensor arrays via said multiple optical paths wherein determining a position of a given control object includes identifying image data relating to the given control object from different optical paths by recognizing signatures of the identifying optical elements upon the image data relating to the given control object; and graphic interface control circuitry including interfacing logic configured to modify the appearance of the control elements, based on signals received from said image processing circuitry indicating the positions of objects within the active space determined by said image processing circuitry based on image information collected by said one or more image sensor arrays via said multiple optical paths;

wherein the active space is a spatial region directly adjacent, contiguous and substantially parallel to said first surface.

20. A human machine interface system comprising:

one or more image sensor arrays;

multiple optical paths directing light from an active space to said one or more image sensor arrays;

rendering circuitry adapted to render and display upon a first surface a graphic user interface comprised of rendered control elements;

user interface circuitry adapted to generate and transmit a user input signal to an associated computational platform, upon a control object contacting any of said control elements;

image processing circuitry functionally associated with said image sensor arrays and adapted to:

(1) receive image data generated by said image sensor arrays, and (2) determine positions of control objects within the active space based on image data collected by said one or more image sensor arrays via said multiple optical paths; and graphic interface control circuitry including interfacing logic configured to modify the appearance of the control elements, based on signals received from said image processing circuitry indicating the positions of objects within the active space determined by said image processing circuitry based on image information collected by said one or more image sensor arrays via said multiple optical paths;

wherein the active space is a spatial region directly adjacent, contiguous and substantially parallel to said first surface.

* * * * *